United States Patent
Gao et al.

(10) Patent No.: US 11,640,505 B2
(45) Date of Patent: May 2, 2023

(54) SYSTEMS AND METHODS FOR EXPLICIT MEMORY TRACKER WITH COARSE-TO-FINE REASONING IN CONVERSATIONAL MACHINE READING

(71) Applicant: salesforce.com, inc., San Francisco, CA (US)

(72) Inventors: Yifan Gao, Hong Kong (CN); Chu Hong Hoi, Singapore (SG); Shafiq Rayhan Joty, Singapore (SG); Chien-Sheng Wu, Singapore (SG)

(73) Assignee: Salesforce.com, Inc., San Francisco, CA (US)

( * ) Notice: Subject to any disclaimer, the term of this patent is extended or adjusted under 35 U.S.C. 154(b) by 299 days.

(21) Appl. No.: 16/863,999

(22) Filed: Apr. 30, 2020

(65) Prior Publication Data

US 2021/0174023 A1 Jun. 10, 2021

Related U.S. Application Data

(60) Provisional application No. 62/945,632, filed on Dec. 9, 2019.

(51) Int. Cl.
*G06F 40/289* (2020.01)
*G06F 16/332* (2019.01)

(52) U.S. Cl.
CPC ........ *G06F 40/289* (2020.01); *G06F 16/3329* (2019.01)

(58) Field of Classification Search
CPC ...... G06F 40/00; G06F 16/00; G06F 16/3329; G06F 40/289; G06F 40/35; G06N 3/0445; G06N 3/0454; G06N 3/08; G06N 3/084
See application file for complete search history.

(56) References Cited

U.S. PATENT DOCUMENTS 10,282,663 B2   5/2019   Socher et al.
10,474,709 B2   11/2019  Paulus
(Continued)

OTHER PUBLICATIONS

Zhong, Victor, and Luke Zettlemoyer. "E3: Entailment-Driven Extracting and Editing for Conversational Machine Reading." Proceedings of the 57th Annual Meeting of the Association for Computational Linguistics, 2019. (Year: 2019).*
(Continued)

*Primary Examiner* — Angela A Armstrong
(74) *Attorney, Agent, or Firm* — Haynes and Boone LLP

(57) ABSTRACT

Embodiments described herein provide systems and methods for an Explicit Memory Tracker (EMT) that tracks each rule sentence to perform decision making and to generate follow-up clarifying questions. Specifically, the EMT first segments the regulation text into several rule sentences and allocates the segmented rule sentences into memory modules, and then feeds information regarding the user scenario and dialogue history into the EMT sequentially to update each memory module separately. At each dialogue turn, the EMT makes a decision among based on current memory status of the memory modules whether further clarification is needed to come up with an answer to a user question. The EMT determines that further clarification is needed by identifying an underspecified rule sentence span by modulating token-level span distributions with sentence-level selection scores. The EMT extracts the underspecified rule sentence span and rephrases the underspecified rule sentence span to generate a follow-up question.

20 Claims, 9 Drawing Sheets

(56) References Cited

U.S. PATENT DOCUMENTS

| | | |
|---|---|---|
| 10,521,465 B2 | 12/2019 | Paulus |
| 10,542,270 B2 | 1/2020 | Zhou et al. |
| 10,558,750 B2 | 2/2020 | Lu et al. |
| 10,565,305 B2 | 2/2020 | Lu et al. |
| 10,565,306 B2 | 2/2020 | Lu et al. |
| 10,565,318 B2 | 2/2020 | Bradbury |
| 10,565,493 B2 | 2/2020 | Merity et al. |
| 10,573,295 B2 | 2/2020 | Zhou et al. |
| 10,592,767 B2 | 3/2020 | Trott et al. |
| 2016/0180217 A1* | 6/2016 | Boston .................. G06F 16/248 706/46 |
| 2016/0350653 A1 | 12/2016 | Socher et al. |
| 2017/0024645 A1 | 1/2017 | Socher et al. |
| 2017/0032280 A1 | 2/2017 | Socher |
| 2017/0140240 A1 | 5/2017 | Socher |
| 2017/0193088 A1* | 7/2017 | Boguraev ............. G06F 16/322 |
| 2018/0096219 A1 | 4/2018 | Socher |
| 2018/0121787 A1 | 5/2018 | Hashimoto et al. |
| 2018/0121788 A1 | 5/2018 | Hashimoto et al. |
| 2018/0121799 A1 | 5/2018 | Hashimoto et al. |
| 2018/0129931 A1 | 5/2018 | Bradbury et al. |
| 2018/0129937 A1 | 5/2018 | Bradbury et al. |
| 2018/0129938 A1 | 5/2018 | Xiong et al. |
| 2018/0268287 A1 | 9/2018 | Johansen et al. |
| 2018/0268298 A1 | 9/2018 | Johansen et al. |
| 2018/0336198 A1 | 11/2018 | Zhong et al. |
| 2018/0336453 A1 | 11/2018 | Merity et al. |
| 2018/0349359 A1 | 12/2018 | Mccann et al. |
| 2018/0373682 A1 | 12/2018 | Mccann et al. |
| 2018/0373987 A1 | 12/2018 | Zhang et al. |
| 2019/0130248 A1 | 5/2019 | Zhong et al. |
| 2019/0130249 A1 | 5/2019 | Bradbury et al. |
| 2019/0130273 A1 | 5/2019 | Keskar et al. |
| 2019/0130312 A1 | 5/2019 | Xiong et al. |
| 2019/0130896 A1 | 5/2019 | Zhou et al. |
| 2019/0188568 A1 | 6/2019 | Keskar et al. |
| 2019/0213482 A1 | 7/2019 | Socher et al. |
| 2019/0251168 A1 | 8/2019 | McCann et al. |
| 2019/0251431 A1 | 8/2019 | Keskar et al. |
| 2019/0258714 A1 | 8/2019 | Zhong et al. |
| 2019/0258939 A1 | 8/2019 | Min et al. |
| 2019/0286073 A1 | 9/2019 | Hosseini-Asl et al. |
| 2019/0295530 A1 | 9/2019 | Hosseini-Asl et al. |
| 2019/0355270 A1 | 11/2019 | Mccann et al. |
| 2019/0362020 A1 | 11/2019 | Paulus et al. |
| 2020/0005765 A1 | 1/2020 | Zhou et al. |
| 2020/0057805 A1 | 2/2020 | Lu et al. |
| 2020/0065651 A1 | 2/2020 | Merity et al. |
| 2020/0084465 A1 | 3/2020 | Zhou et al. |
| 2020/0089757 A1 | 3/2020 | Machado et al. |
| 2020/0090033 A1 | 3/2020 | Ramachandran et al. |
| 2020/0090034 A1 | 3/2020 | Ramachandran et al. |
| 2020/0103911 A1 | 4/2020 | Ma et al. |
| 2020/0104643 A1 | 4/2020 | Hu et al. |
| 2020/0104699 A1 | 4/2020 | Zhou et al. |
| 2020/0105272 A1 | 4/2020 | Wu et al. |
| 2020/0117854 A1 | 4/2020 | Lu et al. |
| 2020/0117861 A1 | 4/2020 | Bradbury |

OTHER PUBLICATIONS

Liu, Shaobo, et al. "Exploiting contextual information via dynamic memory network for event detection." arXiv preprint arXiv: 1810.03449 (2018). (Year: 2018).*

Xiong, Caiming, Stephen Merity, and Richard Socher. "Dynamic memory networks for visual and textual question answering." International conference on machine learning. PMLR, 2016. (Year: 2016).*

Abhishek Sharma, Danish Contractor, Harshit Kumar, Sachindra Joshi, et al. "Neural conversational QA: learning to reason vs exploiting patterns." arXiv preprint arXiv: 1909.03759 (2019). (Year: 2019).*

Bordes et al. "Learning End-to-End Goal-Oriented Dialog," arXiv preprint arXiv:1605.07683, pp. 1-11, 2016.

Choi et al., "QuAC: Question Answering in Context," In Proceedings of the 2018 Conference on Empirical Methods in Natural Language Processing, pp. 2174-2184, Brussels, Belgium, Association for Computational Linguistics, 2018.

Devlin et al, "BERT: Pre-Training of Deep Bidirectional Transformers for Language Understanding," In Proceedings of the Conference of the North American Chapter of the Association for Computational Linguistics: Human Language Technologies, vol. 1 (Long and Short Papers), pp. 4171-4186, Minneapolis, Minnesota. Association for Computational Linguistics, 2019.

Dong et al., "Unified Language Model Pre-training for Natural Language Understanding and Generation," In 33rd Conference on Neural Information Processing Systems (NeurIPS 2019), pp. 1-14, 2019.

Du et al., "Harvesting Paragraph-Level Question-Answer Pairs from Wikipedia," In Proceedings of the 56th Annual Meeting of the Association for Computational Linguistics (vol. 1: Long Papers), pp. 1907-1917, Melbourne, Australia, Jul. 15-20, 2018, Association for Computational Linguistics.

Gao et al., "Interconnected Question Generation with Coreference Alignment and Conversation Flow Modeling," In Proceedings of the 57th Annual Meeting of the Association for Computational Linguistics, pp. 4853-4862, Florence, Italy, Association for Computational Linguistics, 2019.

Graves et al., "Neural Turing Machines," arXiv preprint arXiv:1410.5401, pp. 1-26, 2014.

Graves et al., "Hybrid Computing using a Neural Network with Dynamic External Memory," Nature, 538(7626):471, 2016.

Henaff et al., "Tracking the World State with Recurrent Entity Networks," In 5th International Conference on Learning Representations, ICLR 2017, Toulon, France, Apr. 24-26, 2017, Conference Track Proceedings, OpenReview.net.

Honnibal et al., "spaCy 2: Natural Language Understanding with Bloom Embeddings, Convolutional Neural Networks and Incremental Parsing," doi:10.5281/zenodo.1212304, pp. 1-3, 2017.

Kingma et al., "ADAM: A Method for Stochastic Optimization," In 3rd International Conference on Learning Representations, ICLR 2015, San Diego, CA, USA, May 7-9, 2015, Conference Track Proceedings, pp. 1-15.

Lawrence et al., "Attending to Future Tokens for Bidirectional Sequence Generation," In Proceedings of the Conference on Empirical Methods in Natural Language Processing and the 9th International Joint Conference on Natural Language Processing (EMNLP-IJCNLP), pp. 1-10, Hong Kong, China, Association for Computational Linguistics, 2019.

Liu et al., "Text Summarization with Pretrained Encoders," In Proceedings of the Conference on Empirical Methods in Natural Language Processing and the 9th International Joint Conference on Natural Language Processing (EMNLP-IJCNLP), pp. 3728-3738, Hong Kong, China, Association for Computational Linguistics, 2019.

Madotto et al., "Mem2Seq: Effectively Incorporating Knowledge Bases into End-to-End Task-Oriented Dialog Systems," In Proceedings of the 56th Annual Meeting of the Association for Computational Linguistics (vol. 1: Long Papers), pp. 1468-1478, Melbourne, Australia, Jul. 15-20, 2018, Association for Computational Linguistics.

Papineni et al., "BLEU: A Method for Automatic Evaluation of Machine Translation," In Proceedings of the 40th Annual Meeting of the Association for Computational Linguistics, pp. 311-318, Philadelphia, Pennsylvania, USA, Association for Computational Linguistics, 2002.

Reddy et al., "CoQA: A Conversational Question Answering Challenge," Transactions of the Association for Computational Linguistics, 7:249-266, 2019.

Saeidi et al., "Interpretation of Natural Language Rules in Conversational Machine Reading," In Proceedings of the 2018 Conference on Empirical Methods in Natural Language Processing, pp. 2087-2097, Brussels, Belgium, Association for Computational Linguistics, 2018.

(56) References Cited

OTHER PUBLICATIONS

Sharma et al., "Neural Conversational QA: Learning to Reason v.s. Exploiting Patterns," ArXiv, abs/1909.03759, pp. 1-10, 2019.
Vaswani et al., "Attention is All You Need," In 31st Conference on Neural Information Processing Systems (NIPS 2017), Long Beach, CA, USA.
Wang et al., "Memory-enhanced Decoder for Neural Machine Translation," In Proceedings of the Conference on Empirical Methods in Natural Language Processing, pp. 278-286, Austin, Texas, Association for Computational Linguistics, 2016.
Wen et al., "A Network-Based End-to-End Trainable Task-oriented Dialogue System," In Proceedings of the 15th Conference of the European Chapter of the Association for Computational Linguistics: vol. 1, Long Papers, pp. 438-449, Valencia, Spain, Apr. 3-7, 2017, Association for Computational Linguistics.
Wolf et al., "Huggingface's Transformers: State-of-the-art Natural Language Processing," arXiv:1910.03771, pp. 1-11, 2019.
Wu et al., "Transferable Multi-Domain State Generator for Task-oriented Dialogue Systems," In Proceedings of the 57th Annual Meeting of the Association for Computational Linguistics, pp. 808-819, Florence, Italy, Jul. 28-Aug. 2, 2019, Association for Computational Linguistics.
Wu et al., "Global-to-local Memory Pointer Networks for Task-Oriented Dialogue," 32nd Conference on Neural Information Processing Systems, Montréal, Canada pp. 1-23, 2018.
Zhang et al., "Memory augmented Dialogue Management for Task-oriented Dialogue Systems," ACM Transactions on Information Systems (TOIS), 37(3):34, 2019.
Zhong et al., "Global-Locally Self-Attentive Encoder for Dialogue State Tracking," In Proceedings of the 56th Annual Meeting of the Association for Computational Linguistics (vol. 1: Long Papers), pp. 1458-1467, Melbourne, Australia, Jul. 15-20, 2018, Association for Computational Linguistics.
Zhong et al., "E3: Entailment-driven Extracting and Editing for Conversational Machine Reading," In Proceedings of the 57th Annual Meeting of the Association for Computational Linguistics, pp. 2310-2320, Florence, Italy, Association for Computational Linguistics, 2019.

\* cited by examiner

900

| Models | End-to-End Task (Leaderboard Performance) | | | |
|---|---|---|---|---|
| | Micro Acc. | Macro Acc. | BLEU1 | BLEU4 |
| Seq2Seq (Saeidi et al., 2018) | 44.8 | 42.8 | 34.0 | 7.8 |
| Pipeline (Saeidi et al., 2018) | 61.9 | 68.9 | 54.4 | 34.4 |
| BERTQA (Zhong and Zettlemoyer, 2019) | 63.6 | 70.8 | 46.2 | 36.3 |
| UrcaNet (Sharma et al., 2019)* | 65.1 | 71.2 | 60.5 | 46.1 |
| BiSon (Lawrence et al., 2019) | 66.9 | 71.6 | 58.8 | 44.3 |
| E³ (Zhong and Zettlemoyer, 2019) | 67.6 | 73.3 | 54.1 | 38.7 |
| EMT (single model) | 69.4 | 74.8 | 60.9 | 46.0 |

910 → EMT row

| Models | Yes | No | Inquire | Irrelevant |
|---|---|---|---|---|
| BERTQA | 61.2 | 61.0 | 62.6 | 96.4 |
| E³* | 65.9 | 70.6 | 60.5 | 96.4 |
| UrcaNet* | 63.3 | 68.4 | 58.9 | 95.7 |
| EMT | 63.3 | 74.8 | 65.7 | 98.6 |

1010 → EMT row

| Models | Oracle Question Generation Task | | | |
|---|---|---|---|---|
| | Development Set | | Cross Validation | |
| | BLEU1 | BLEU4 | BLEU1 | BLEU4 |
| E³ | 52.79±2.87 | 37.31±2.35 | 51.75 | 35.94 |
| E³+UniLM | 57.09±1.70 | 41.05±1.90 | 56.94 | 42.87 |
| EMT | 62.32±1.62 | 47.89±1.58 | 64.48 | 52.40 |

1110 → EMT row

| Models | End-to-End Task | | | | Oracle Question Generation Task | |
|---|---|---|---|---|---|---|
| | Micro Acc. | Macro Acc. | BLEU1 | BLEU4 | BLEU1 | BLEU4 |
| EMT | 70.76±0.64 | 76.09±0.63 | 67.32±0.89 | 52.31±1.33 | 62.32±1.62 | 47.89±1.58 |
| EMT (w/o data aug.) | 69.50±0.84 | 75.59±0.71 | 65.56±0.89 | 50.29±1.00 | 63.08±1.13 | 48.47±0.84 |
| EMT (w/o c2f) | 70.09±1.44 | 75.87±1.28 | 65.33±1.45 | 50.30±1.33 | 61.55±1.71 | 46.61±1.47 |
| EMT (w/o L) | 67.81±1.38 | 73.50±0.83 | 63.84±1.80 | 49.35±2.10 | 60.50±1.18 | 45.34±1.73 |
| EMT (w/o tracker) | 67.42±1.13 | 72.73±0.74 | 63.26±0.64 | 47.97±0.40 | 61.87±1.46 | 47.13±1.35 |

FIG. 12

SYSTEMS AND METHODS FOR EXPLICIT MEMORY TRACKER WITH COARSE-TO-FINE REASONING IN CONVERSATIONAL MACHINE READING

CROSS-REFERENCE TO RELATED APPLICATIONS

This application claims the benefit of U.S. Provisional patent Application No. 62/945,632, filed on Dec. 9, 2019, entitled "Systems and Methods for Explicit Memory Tracker with Coarse-To-Fine Reasoning in Conversational Machine Reading," which is incorporated by reference in its entirety.

TECHNICAL FIELD

The present disclosure relates generally to training and use of machine learning systems and more specifically to explicit memory tracker with coarse-to-fine reasoning in conversational machine reading.

BACKGROUND

Neural networks have demonstrated great promise as a technique for automatically analyzing real-world information with human-like accuracy. In general, neural network models receive input information and make predictions based on the input information. For example, a neural network classifier may predict a class of the input information among a predetermined set of classes. Whereas other approaches to analyzing real-world information may involve hard-coded processes, statistical analysis, and/or the like, neural networks learn to make predictions gradually, by a process of trial and error, using a machine learning process. A given neural network model may be trained using a large number of training examples, proceeding iteratively until the neural network model begins to consistently make similar inferences from the training examples that a human may make. Neural network models have been shown to outperform and/or have the potential to outperform other computing techniques in a number of applications. Indeed, some applications have even been identified in which neural networking models exceed human-level performance.

Conversational machine reading is a subarea in natural language processing to which neural networks may be applied. Conversational machine reading aims to teach machines to interact with users and answer their questions. Conversational machine reading facilitates a dialogue with users by providing questions to users to help solve their problems. Conversational machine reading is challenging because machines have to understand the knowledge base regulation text, evaluate and keep track of user scenarios, ask clarification questions, and then reply to the user inquiry with a final decision. During the interactive process between the user and the machine, the machine typically generates a series of clarifying questions for presentation to the user based on the regulation text until the dialogue with the user can be concluded with a certain answer, as the user often does not have knowledge of the regulation text to provide relevant information in a single turn. Existing approaches have implicit rule text reasoning processes for decision making and impractical abilities for question-related rule extraction. Therefore, there is a need for an effective way to generate clarifying questions in conversational machine reading.

BRIEF DESCRIPTION OF THE DRAWINGS

FIG. 9 illustrates a tabular listing of end-to-end task performance metrics, according to some embodiments.

FIG. 10 illustrates a tabular listing of class-wise prediction accuracy values, according to some embodiments.

FIG. 11 illustrates a tabular listing of question generation task performance metrics, according to some embodiments.

FIG. 12 illustrates a tabular listing of ablation study results on the end-to-end tasks and question generation tasks, according to some embodiments.

DETAILED DESCRIPTION

Figure 1:
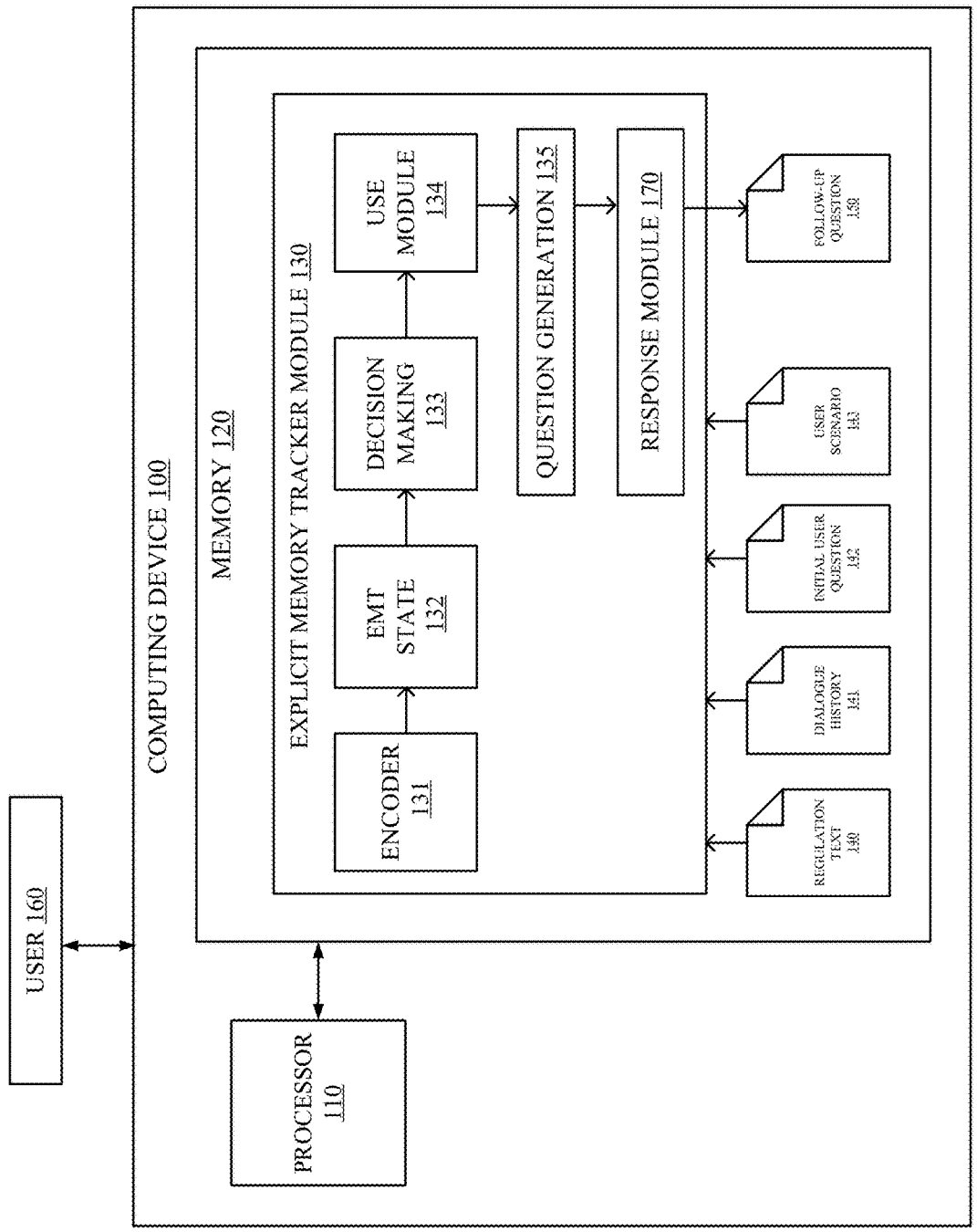
FIG. 1 is a simplified diagram of a computing device with explicit memory tracking in conversational machine reading, according to some embodiments.

The subject technology provides for a Conversational Machine Reading (CMR) system with a novel Explicit Memory Tracker (EMT) module that tracks whether conditions listed in a rule text have already been satisfied to generate a decision. The EMT module can generate clarifying questions by adopting a coarse-to-fine reasoning process and utilizing sentence-level selection scores for weighting token-level span distributions. Moreover, the EMT module can visualize the entailment-oriented reasoning process as the conversation flows.

CMR systems have several advantages over traditional machine reading tasks because machines having neural networks trained to perform CMR can take initiative to prompt users with questions that help solve any of their queries, instead of reaching to a conclusion abruptly. In CMR systems, machines need to be trained to understand the Knowledge Base (KB) text, evaluate and keep track of the user scenario, prompt users with clarification questions, and then generate a final decision. This interactive behavior with users is advantageous over traditional dialogue systems because in practice users are unaware of the KB text, thus users may not provide all the information needed in a single dialogue turn.

CMR systems may be a particular type of task-oriented dialogue system to help users resolve their inquiries. However, machines trained to perform CMR may not rely on predefined slot and ontology information but rather can utilize natural language rules. CMR systems differ from existing dialogue systems that perform standard question and answering functions in that (1) machines with neural networks trained to perform CMR can formulate follow-up questions to fill the information gap in the dialogue with users, and 2) the machines are trained to interpret a set of complex decision rules and generate a question-related conclusion, instead of extracting the answer from the text such as in existing dialogue systems.

Existing CMR systems often implement a two-prong process, in which two sub-tasks are initiated to generate clarifying questions in a user-machine conversation, including a decision-making task and a question generation task. Specifically, the first sub-task implemented by the decision-making task is initiated to generate a decision at each dialogue turn by selecting among multiple decision classes, such as "Yes/No/Irrelevant/Inquire" based on the regulation text, user scenario, initial user question and dialogue history. When either one of the decision classes "Yes/No/Irrelevant" is selected, a final decision related to the initial user question can be made. If the decision at the current dialogue turn is "Inquire," the second sub-task implemented by a question generation task is initiated. For example, an underspecified rule span may be extracted from the regulation text, based on which a follow-up question may be generated accordingly. However, the two-prong process requires implicit regulation text reasoning, which may not be interpreted properly to indicate whether each condition listed in the regulation text has been satisfied while a conversation continues to progress. The existing two-prong process also exhibits insufficient question-related rule extraction, as it is generally difficult for machines implemented as existing CMR systems to extract the most relevant text span from the rule text to generate follow-up questions.

In view of the need for improved effectiveness in conversational machine reasoning, embodiments described herein provide systems and methods for the novel EMT module, which can track each rule sentence to perform decision making and generate follow-up questions. Specifically, the EMT module can first segment the regulation text into multiple rule sentences and allocate the segmented rule sentences into respective memory modules. Subsequently, information describing the user scenario and dialogue history can be fed sequentially into the EMT module to update each memory module separately. At each dialogue turn, the EMT module can generate a decision among the decision classes "Yes/No/Irrelevant/Inquire" based at least on a current memory status of the memory modules. If the generated decision is "Inquire," the EMT module can extract a rule span to generate a follow-up question by implementing a coarse-to-fine reasoning process, weighting token-level span distributions with sentence-level selection scores from the memory modules.

Some existing CMR systems utilize a ShARC (Shaping Answers with Rules through Conversation) dataset to provide an end-to-end bidirectional sequence generation approach with mixed decision making and question generation stages divided into sub-tasks that combine hand-designed sub-models for decision classification, entailment and question generation. Other existing CMR systems extract all possible rule text spans, assign each of them an entailment score, and edit the span with the highest score into a follow-up question. However, these existing CMR systems do not use the entailment scores for decision making. Still other existing CMR systems study patterns of the dataset and include additional embeddings from a dialogue history and user scenario as rule markers to facilitate the decision making. In comparison to these existing CMR systems, the EMT module of the subject technology has at least two key differences: (1) the EMT module can generate a decision via explicitly entailment-oriented reasoning; and (2) the EMT module implements a unified approach that exploits its memory states for both decision making and question generation, instead of treating decision making and follow-up question generation (or span extraction) separately. Moreover, the EMT module is more interpretable than existing CMR systems by visualizing the entailment-oriented reasoning process as the conversation flows.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks, such as supervised or unsupervised neural networks, convolutional neural networks, or memory-augmented neural networks, among others.

FIG. 1 is a simplified diagram of a computing device 100 for implementing one or more neural networks to generate clarifying questions in conversational machine reading according to some embodiments. Computing device 100 includes processor 110 and memory 120. Memory 120 includes explicit memory tracker module 130 (hereinafter referred to as "EMT module 130"). EMT module 130 includes an encoder module 131, an EMT state module 132, a decision making module 133, an underspecified span extraction module 134 and a question generation module 135. In some examples, EMT module 130 may be used to receive and handle the input of a regulation text 140, a dialogue history 141, a initial user question 142 and a user scenario 143. In some examples, the EMT module 130 may also handle the iterative training and/or evaluation of a system or model used for question answering tasks. The modules and/or submodules 131-135 may be serially connected or connected in other manners. For example, EMT state module 132 may receive from the encoder module 131 an output, e.g., an encoded vector representation of the regulation text 140, dialogue history 141, the initial user question 142, and/or the user scenario 143. In some aspects, the encoded vector representation optionally includes an encoded representation of the dialog history 141. In some examples, EMT module 130 and the sub-modules 131-135 may be implemented using hardware, software, and/or a combination of hardware and software. Although FIG. 1 depicts the regulation text 140, the dialogue history 141, the initial user question 142 and the user scenario 143 in a particular arrangement as input to the EMT module 130, it should be appreciated that any one of these modules may be performed in an order or arrangement different from the embodiment illustrated by FIG. 1.

As shown in FIG. 1, processor 110 is coupled to memory 120. Operation of computing device 100 is controlled by processor 110. And although computing device 100 is shown with only one processor 110, it is understood that processor 110 may be representative of one or more central processing units (CPUs), multi-core processors, microprocessors, microcontrollers, and/or the like in computing device 100. Although processor 110 may include one or more general purpose central processing units (CPUs), processor 110 may additionally or alternately include at least one processor that provides accelerated performance when evaluating neural network models. For example, processor 110 may include a graphics processing unit (GPU), an application specific integrated circuit (ASIC), a field programmable gate array (FPGA), a tensor processing unit (TPU), a digital signal processor (DSP), a single-instruction multiple-data (SIMD) processor, and/or the like. Generally, such processors may accelerate various computing tasks associated with evaluating neural network models (e.g., training, prediction, preprocessing, and/or the like) by an order of magnitude or more in comparison to a general-purpose CPU. Computing device 100 may be implemented as a stand-alone subsystem, as a board added to a computing device, and/or as a virtual machine.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

Memory 120 may be used to store instructions executable by computing device 100 and/or one or more data structures used during operation of computing device 100. Memory 120 may include one or more types of machine-readable media. In some examples, memory 120 may include non-transitory, tangible, machine-readable media that includes executable code that when run by one or more processors (e.g., processor 110) may cause the one or more processors to perform the methods described in further detail herein. Memory 120 may include various types of short-term and/or long-term storage modules including cache memory, random access memory (RAM), static random access memory (SRAM), dynamic random access memory (DRAM), non-volatile memory (NVM), flash memory, solid state drives (SSD), hard disk drive (HDD), optical storage media, magnetic tape, any other memory chip or cartridge, and/or any other medium from which a processor or computer is adapted to read. Some common forms of machine-readable media may include flexible disk, hard disk, magnetic tape, any other magnetic medium, compact disk read-only memory (CD-ROM), any other optical medium, punch cards, paper tape, any other physical medium with patterns of holes, programmable read-only memory (PROM), erasable programmable read-only memory (EPROM), electrically erasable programmable read-only memory (EEPROM), any other memory chip or cartridge, and/or any other medium from which a processor or computer is adapted to read.

In some embodiments, memory 120 includes instructions for EMT module 130 that may be used to implement and/or emulate the systems and models, and/or to implement any of the methods described further herein. Each of EMT state module 132, decision making module 133, and underspecified span extraction module 134 may correspond to a neural network model that is evaluated by processor 110. In particular, each of EMT state module 132, decision making module 133, and underspecified span extraction module 134 may include a plurality of neural network layers. Examples of neural network layers include densely connected layers, convolutional layers, recurrent layers, pooling layers, dropout layers, and/or the like. In some embodiments, each of EMT state module 132, decision making module 133, and underspecified span extraction module 134 may include at least one hidden layer that is not directly connected to either an input or an output of the neural network. Each of EMT state module 132, decision making module 133, and underspecified span extraction module 134 may further include a plurality of model parameters (e.g., weights and/or biases) that are learned according to a machine learning process. Examples of machine learning processes include supervised learning, reinforcement learning, unsupervised learning, and/or the like.

According to some embodiments, a user 160 may engage in a dialogue with computing device 100. For example, user 160 may communicate with computing device 100 using any suitable form of communication, including verbal communication (e.g., spoken utterances), written communication (e.g., alphanumeric text and/or symbols), visual communication (e.g., gestures), and/or the like. In response, computing device 100 may provide one or more system responses (e.g., providing a response dialogue to user 160, performing a task on behalf of user 160, requesting additional information, and/or the like).

Computing device 100 may receive input such as the regulation text 140, the dialogue history 141 and the initial user question 142, which is provided to the EMT module 130. The EMT module 130 operates on the input 140-143 via the encoder module 131, the EMT state module 132, the decision making module 133, the underspecified span extraction module 134 and the question generation module 135 to generate an output of a follow-up question 150 corresponding to the initial user question 142 that is then output via a response module 170. The functionalities, structures and/or operations of the submodules 131-135 are further described in relation to FIG. 3.

In some embodiments, EMT module 130 maintains EMT state module 132. At each exchange of the dialogue (e.g., at each communication received from user 160 and/or system response provided by computing device 100), EMT module 130 may update EMT state module 132. For example, EMT state module 132 may be updated to include a memory state that describes one or more entailment states of each segmented rule in the regulation text 140 over the course of the dialogue with user 160.

Additionally or alternately, EMT module 130 may maintain a user scenario of a current dialogue with user 160 using dialogue history 141 and/or user scenario 143. For example, dialogue history 141 may include a history of one or more previous system responses by computing device 100 (e.g., previous actions taken), which provide context for a current communication received from user 160. In other examples, dialogue history 141 may include a history of one or more conversation exchanges between a user (e.g., user 160) and computing device 100. In some examples, the user scenario 143 may include a topic or a category of the subject matter for the line of questioning and/or query with the user 160.

In some embodiments, memory 120 may store the follow-up question 150 that is utilized to generate one or more system responses to provide or perform in response to a given user communication based, at least in part, on the initial user question 142. Examples of system responses include generating and sending a response dialogue to user 160, performing a task on behalf of user 160, requesting additional information from user 160, and/or the like. In some embodiments, EMT module 130 may record the system response at a given exchange, e.g., by updating EMT state module 132. In this manner, EMT state module 132 may provide updated memory states to decision making module 133 based on previous actions taken by computing device 100.

Figure 2:
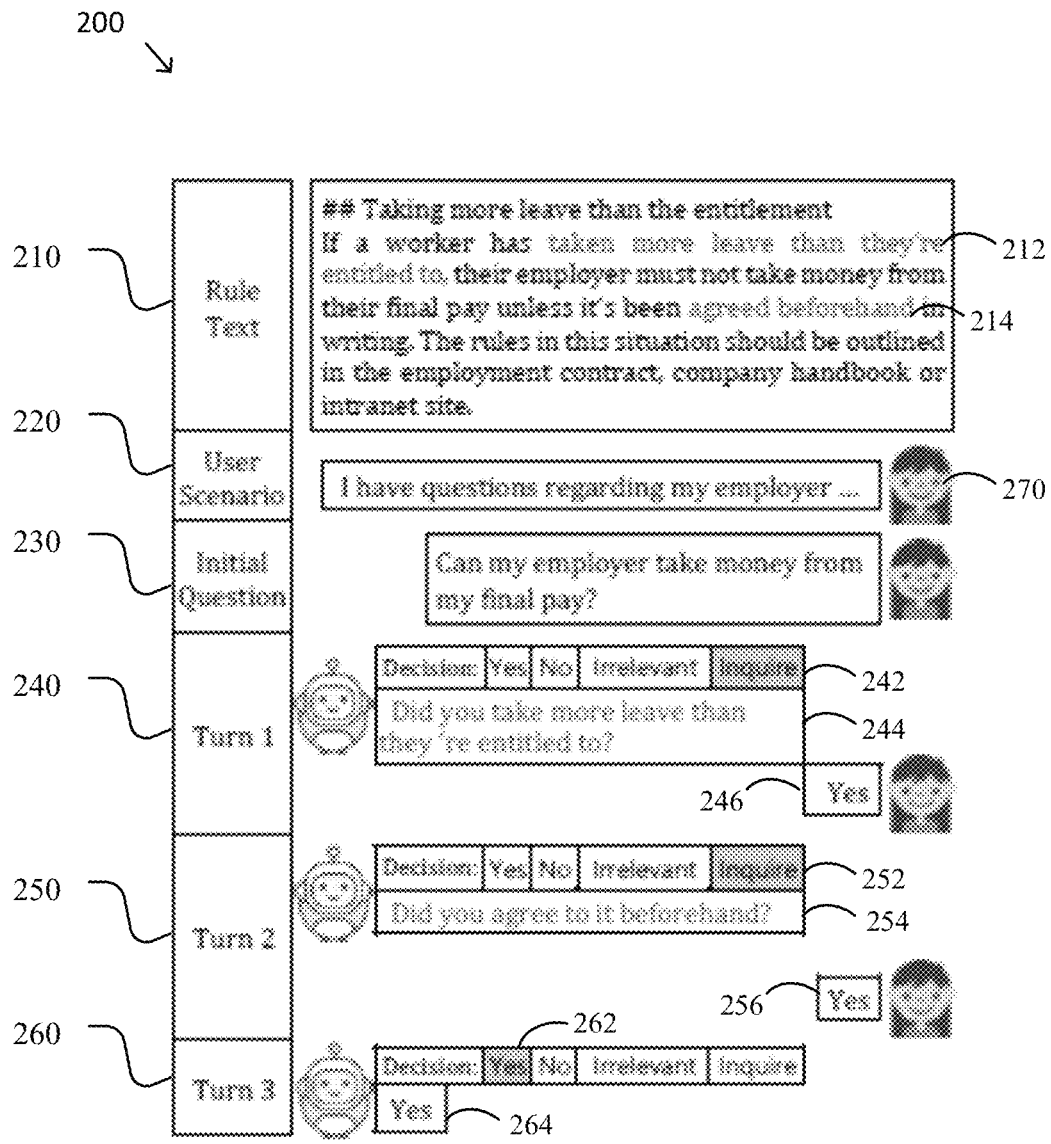
FIG. 2 is a simplified diagram of an example of conversational machine reading tasks, according to some embodiments.

FIG. 2 is a simplified diagram of an example of conversational machine reading tasks 200, according to some embodiments. In various embodiments, the conversational machine reading tasks 200 may be implemented by a rule text 210, a user scenario 220, an initial user question 230 and one or more dialogue turns, such as dialogue turns 240, 250 and 260. A user 270 may provide user input that indicates the user scenario 220 and additional user input that indicates the initial user question 230. At each dialogue turn, based at least on the rule text 210, the user scenario 220, the initial user question 230, and any previous interactions, a machine can generate and provide a certain final answer such as Yes or No to the initial user question 230. If the machine cannot generate a certain final answer because of missing information from the user 270, the machine may generate and present a clarification question to the user 270 to fill in the information gap.

As depicted in FIG. 2, the user 270 provides user input with the initial user question 230 that indicates a question on whether her employer can take money from her final pay, and describe the user scenario 220 of the user 270. Without knowing the rule text 210, the given user scenario 220 may not offer any useful information to the machine to serve as a response with a certain final answer to the initial user question 230. Therefore, the machine may have to generate and present a series of clarification questions based on the rule text 210 until the machine can conclude the conversation with a certain final answer. For example, the machine, at a first dialogue turn 240 (depicted as "Turn 1"), determines a decision 242 (depicted as "Inquire"), which triggers the generation of a first follow-up question 244 that corresponds to rule sentence 212 in the rule text 210. The user 270 provides a response 246 (depicted as "Yes") to the follow-up question 244, which prompts the machine at a second dialogue turn 250 to determine a decision 252 (depicted as "Inquire") to generate another follow-up question 254 that corresponds to rule sentence 214 in the rule text 210. The user 270 provides a response 256 to the follow-up question 254, which prompts the machine to determine a decision 262 to generate a certain final answer 264. The two follow-up questions allowed the machine to fill in the information gap from the user scenario 220 and the initial user question 230.

Most existing CMR approaches formalize the user-machine conversation problem into two sub-tasks. The first sub-task corresponds to the machine determining a decision class among Yes, No, Irrelevant, and Inquire, at each dialogue turn given the rule text 210, the user scenario 220, the initial user question 230 and a current dialogue history. When the machine selects one of classes Yes, No, or Irrelevant, the machine implies a final decision can be made in response to the initial user question 230 based on either the Yes or No selection (e.g., 262), or stating the initial user question 230 is unanswerable according to the rule text 210 based on the Irrelevant selection. When the machine determines that the decision class at a current dialogue turn is Inquire (e.g., 242, 252), the machine can then trigger the second sub-task for follow-up question generation, which extracts an underspecified rule span from the rule text 210 and generates a follow-up question accordingly (e.g., 244, 254).

However, there are two main drawbacks to the existing CMR approaches. First, with respect to reasoning of the rule text 210 for decision making, the machine may not interpret (or track) whether a condition listed in the rule text 210 has already been satisfied as the conversation flows. Second, with respect to the extraction of question-related rules, the machine may not extract the most relevant text span to generate the next follow-up question. For example, some of the existing CMR approaches can only achieve about 61% relevance for question-related span extraction.

The subject technology addresses this technical problem by tracking each rule sentence to make decisions and generate follow-up questions with EMT module 130. Specifically, the EMT module 130 first segments the rule text 210 (implemented by the regulation text 140) into one or more rule sentences with the encoder module 131 and allocates the rule sentence segments into respective memory modules in the memory 120. Subsequently, the user scenario 220, the initial question 230 (implemented by the initial user question 142), and dialogue history (implemented by the dialogue history 141) are fed into EMT module 130 sequentially to update each memory module separately. At each dialogue turn (e.g., 240, 250, 260), EMT module 130 determines a decision based on a current memory status that corresponds to that dialogue turn. When EMT module 130 determines the decision corresponds to "Inquire," EMT module 130 extracts a rule span from an encoded vector representation of the regulation text 140 to generate a follow-up question (e.g., 244, 254) by adopting a coarse-to-fine reasoning process that involves weighting token-level span distributions with sentence-level selection scores of the rule span. Compared to the existing CMR approaches that separate decision making and follow-up question generation, EMT module 130 utilizes the updated memory modules to accomplish these two sub-tasks in a unified manner. The functionalities, structures and/or operations of the EMT module 130 are further described in relation to FIG. 3.

In some embodiments, the conversational machine reading tasks 200 may be implemented with the ShARC dataset. The ShARC dataset may include about 948 dialogue trees, which are flattened into about 32,436 dataset examples by considering all possible nodes in the dialogue trees. Each example may be a quintuple of contextual data (e.g., rule text, initial question, user scenario, dialogue history, decision), where the resulting decision may be either one of Yes, No, Irrelevant or a follow-up question. In an embodiment, the training dataset, development dataset, and test dataset sizes may be 21890, 2270, and 8276, respectively.

Figure 3:
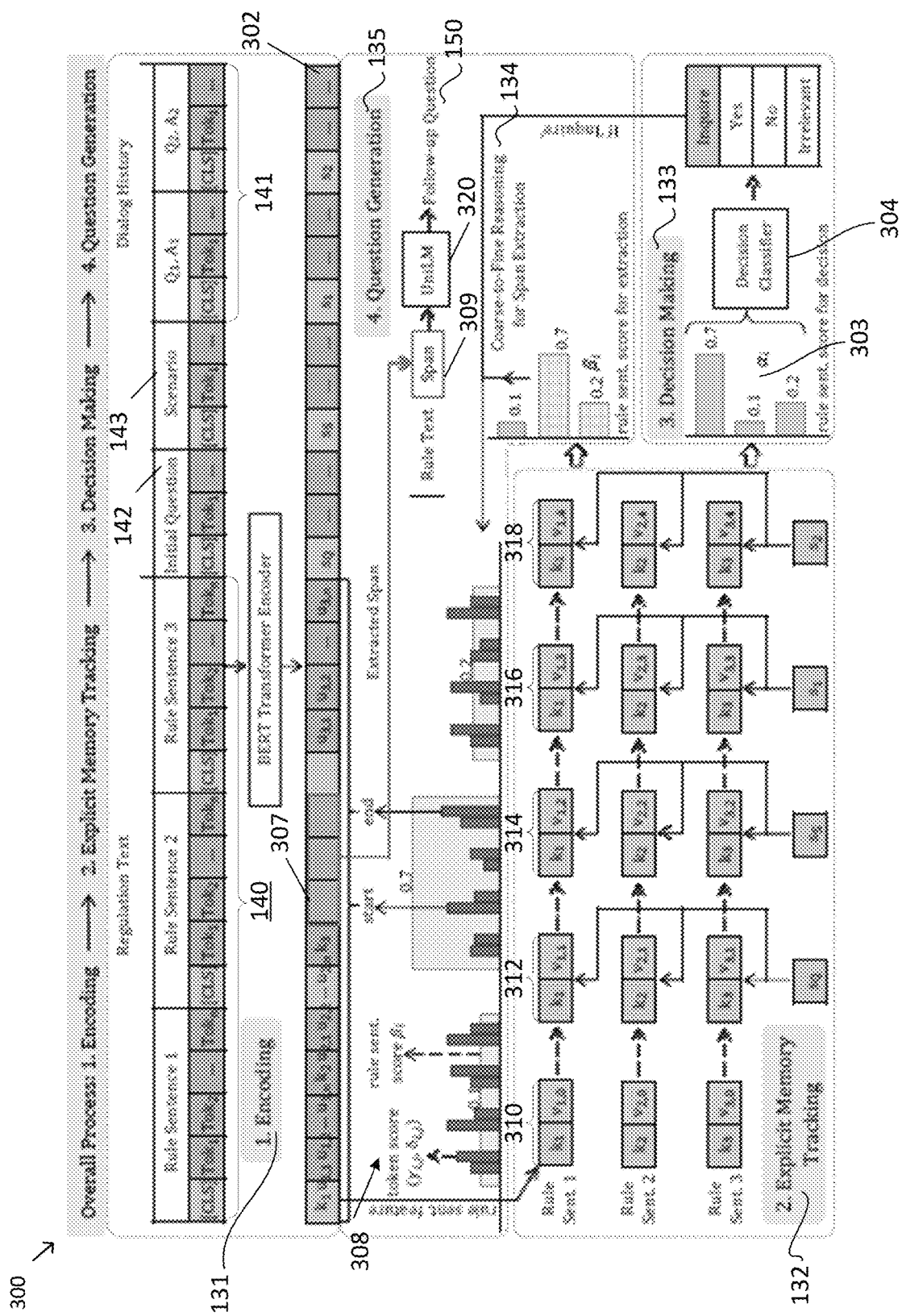
FIG. 3 is a simplified diagram illustrating an example workflow structure of an explicit memory tracker module described in FIG. 1, according to some embodiments.

FIG. 3 is a simplified diagram illustrating an example workflow structure 300 of the EMT module 130 described in FIG. 1 for generating clarifying questions in conversational machine reading, according to some embodiments. In various embodiments, EMT module 130 performs coarse-to-fine reasoning for CMR. As depicted in FIG. 3, the workflow structure 300 of the EMT module 130 includes (1) encoding subprocess that is implemented by the encoder module 131, (2) explicit memory tracking subprocess that is implemented by the EMT state module 132 for determining the entailment state of each rule sentence, (3) decision making subprocess that is implemented by the decision making module 133 for determining a decision based on updated entailment states of all rule sentences, and (4) question generation subprocess implemented by the question generation module 135 for generating follow-up questions via span extraction with coarse-to-fine reasoning and question rephrasing of the extracted span.

The input sequence may include multiple segments of the regulation text 140, followed by the initial user question 142, the user scenario 143 and the dialog history 141 (if any). The regulation text 140 may be divided into multiple segments that correspond to respective rule sentences in the regulation text 140 (depicted as Rule Sentence 1, Rule Sentence 2, Rule Sentence 3). The user scenario may precede the dialog history, which may include one or more dialogue turns (depicted as $Q_1, A_1, Q_2, A_2$).

Tokenization

In an embodiment, the regulation text 140, the dialog history 141, the user scenario 143 and the initial user question 142 may be concatenated into an input sequence of token vectors of the input, by which each vector contains a number of tokenized portions (depicted as "$Tok_1$, $Tok_2$, . . . , $Tok_n$"), including a classification token (depicted as "CLS") at the starting position of each token vector. For example, let $x_R$, $x_Q$, $x_S$, $[x_{H,1}, x_{H,2}, \ldots, x_{H,P}]$ denote the input of the regulation text 140, the initial user question 142, the user scenario 143, and P turns of the dialogue history 141, each of which is a sequence of tokens. In an embodiment, the regulation text 140 denoted as $x_R$ is first divided into several rule sentences $[x_{R,1}, x_{R,2}, \ldots, x_{R,M}]$ according to a sentence boundary or any other type of sentence formatting such as bullet points, where M corresponds to the number of rule sentences present in the regulation text 140. Subsequently, the classification tokens denoted by [CLS] are inserted at the start of each rule sentence. The classification token along with the rule sentences are concatenated into a sequence represented as, for example, [[CLS], $x_{R,1}$; . . . ; [CLS], $x_{R,M}$; [CLS], $x_Q$; [CLS], $x_S$; [CLS], $x_{H,1}$; . . . ; [CLS], $x_{H,P}$]. In an embodiment, the text inputs are tokenized with a tokenization algorithm, such as spaCy.

Transformer Encoder

The encoder module 131 can encode the concatenation of the regulation text 140, the user scenario 143, the dialogue history 141 and the initial user question 142 into a contextualized representation vector 302. In various embodiments, the encoder module 131 may be implemented by an encoder with an attention-based architecture for natural language processing, such as a Bidirectional Encoder Representations from Transformers (BERT) encoder (or hereinafter referred to as "BERT transformer encoder"). In some embodiments, the BERT transformer encoder may include a plural number of encoder blocks interconnected to one another to generate the encoder output. In various embodiments, the BERT transformer encoder is, or includes at least a portion of, a pre-trained transformer language model.

In various embodiments, the BERT transformer encoder encodes the input sequence into an encoded sequence of vectors with the same length as that of the input sequence. Each classification token symbol (e.g., [CLS]) is processed by the BERT transformer encoder as a feature representation of the sentence (or at least a string of characters) that follows. In this respect, both token-level representation and sentence-level representation can be generated by the BERT transformer encoder for each sentence. In an embodiment, the sentence-level representation of the rule sentences is denoted as $k_1, \ldots, k_M$ and the token-level representation of the rule sentences is denoted as $[(u_{1,1}, \ldots, u_{1,n1}), \ldots, (u_{M,1}, \ldots, u_{M,nM})]$, where $n_i$ corresponds to the number of tokens for rule sentence $_i$. Similarly, the sentence-level representation of the initial user question 142, the user scenario 143, and P turns of the dialogue history 141 is denoted as $s_Q$, $s_S$, and $s_1, \ldots, s_P$, respectively. In various embodiments, the vectorized representations of the input in the contextualized representation vector 302 are of d dimensions.

EMT State Module

In various embodiments, the EMT state module 132 may be implemented by a gated recurrent memory-augmented neural network that is trained to track the entailment states of rule sentences by sequentially reading the user provided information. Given the rule sentences denoted as $k_1, \ldots, k_M$ in the contextualized representation vector 302 and user provided information including the initial user question 142 denoted as $s_Q$, the user scenario 143 denoted as $s_S$, and P turns of the dialogue history 141 denoted as $s_1, \ldots, s_P$, the EMT state module 132 is trained to detect implications between the rule sentences and the user provided information.

In an embodiment, the EMT state module 132 sequentially reads the contextualized representation vector 302 that includes the initial user question 142, the dialog history 141 and the user scenario 143 to determine updates to an entailment state of each rule sentence in the regulation text 140 and to perform write operations to respective memory modules of the rule sentences with the determined entailment state updates.

In various embodiments, the EMT state module 132 explicitly processes the rule sentences in terms of sentence-level representations $k_1, \ldots, k_M$ as keys and the EMT state module 132 assigns a state denoted as vi to each of the keys to store any updated entailment information, which indicates whether the rule sentence has been entailed from the user provided information (e.g., 141-143). In an embodiment, each key state value $v_i$ is initialized with the same value of its corresponding rule sentence expressed as $v_{i,0}=k_i$. In various embodiments, each key (e.g., $k_i$) in the contextualized representation vector 302 has an explicit meaning that corresponds to the rule sentence, in which the keys change according to different rule texts of the corresponding rule sentences. In an embodiment, the number of keys is dynamically generated according to the number of sentences parsed from the regulation text 140.

In various embodiments, the contextualized representation vector 302 is allocated to a plural number of memory modules in the memory 120, such that each of the vectorized representations of the input in the contextualized representation vector 302 are allocated to a respective memory module. For example, the vectorized representations of the input associated with a first rule sentence in the regulation text 140 are allocated to memory modules 310-318. As depicted in FIG. 3, the memory module 310 includes the sentence-level representation of the first rule sentence as a first key denoted as $k_1$ and corresponding state information denoted as $v_{1,0}$, the memory module 312 includes the first key and corresponding state information denoted as $v_{1,1}$, the memory module 314 includes the first key and corresponding state information denoted as $v_{1,2}$, the memory module 316 includes the first key and corresponding state information denoted as $v_{1,3}$, and the memory module 318 includes the first key and corresponding state information denoted as $v_{1,4}$.

The EMT state module 132 sequentially reads the user provided information (e.g., 141-143) in terms of sentence-level representations $s_Q$, $s_S$, $s_1, \ldots, s_P$. At time step t, the key state value $v_{i,t}$ for i-th rule sentence can be updated by incorporating the user provided information $s_t \in \{s_Q, s_S, s_1, \ldots, s_P\}$, $$\tilde{v}_{i,t} = ReLU(W_k k_i + W_v v_{i,t} + W_s s_t), \qquad \text{Equation (1)}$$

$$g_i = \sigma(s_t^T k_i + s_t^T v_i) \in [0, 1], \qquad \text{Equation (2)}$$

$$v_{i,t} = v_{i,t} + g_i \odot \tilde{v}_{i,t} \in \mathbb{R}^d, \qquad \text{Equation (3)}$$

$$v_{i,t} = \frac{v_{i,t}}{\|v_{i,t}\|}, \qquad \text{Equation (4)}$$

where $W_k, W_v, W_s \in \mathbb{R}^{d \times d}$, $\sigma$ represents a sigmoid function, and $\odot$ represents a scalar product. As the user background input denoted as $s_t$ may be relevant to parts of the rule sentences, the gating function in Equation 2 may operatively compare $s_t$ to the memory modules of the memory 120. As such, the EMT state module 132 can update the key state value $v_{i,t}$ with the gated operation of Equation 2. Subsequently, the EMT state module 132 can perform a normalization operation to allow the EMT state module 132 to purge any previous information, if implemented. In an embodiment, after the EMT state module 132 sequentially reads the user provided information (e.g., the initial user question 142, the user scenario 143, and P turns of the dialogue history 141) and completes the entailment-oriented reasoning operation, keys and final states of the rule sentences are denoted as $(k_1, v_1), \ldots, (k_M, v_M)$, which can be utilized by the decision making module 133 and/or the question generation module 133.

Decision Making Module

The decision-making module 133 may include a decision classifier 204 that performs entailment-oriented reasoning according to the most updated states 303 of rule sentences and makes a prediction among four possible classes, such as Yes, No, Irrelevant, Inquire. Based at least on the updated key state values of rule sentences (e.g., $(k_1, v_1), \ldots, (k_M, v_M)$) from the EMT state module 132, the decision making module 133 with the decision classifier 304 can select a decision class among Yes, No, Irrelevant, and Inquire, by predicting the decision class from a rule sentence score that corresponds to an attention weight.

In various embodiments, the decision classifier 304 includes a self-attention layer that is used to compute a summary vector c for an overall entailment state, which can be expressed as follows:

$$\alpha_i = w_\alpha [k_i; v_i] + b_\alpha \in \mathbb{R} \qquad \text{Equation (5)},$$

$$\tilde{\alpha}_i = \text{softmax}(\alpha)_i \in [0,1] \qquad \text{Equation (6)},$$

$$c = \Sigma \tilde{\alpha}_i [k_i; v_i] \in \mathbb{R}^d \qquad \text{Equation (7)},$$

where $\alpha_i$ denotes the attention weight for rule sentence $k_i$ that indicates the likelihood that k is entailed from the user provided information, and $[k_i; v_i]$ denotes the concatenation of the vector $k_i$ and $v_i$. For example, the first rule sentence has an attention weight $\alpha_1$ of about 0.1, the second rule sentence has an attention weight $\alpha_2$ of about 0.7, and the third rule sentence has an attention weight $\alpha_3$ of about 0.2. In this respect, the attention weight $\alpha_2$ indicates that the second rule sentence $k_2$ has the highest likelihood of being entailed from the user provided information among the three rule sentences.

The decision classifier 304 can generate the final decision prediction through a linear transformation operation of the summary vector c, which can be expressed as follows:

$$z = W_z c + b_z \in \mathbb{R}^4 \qquad \text{Equation (8)},$$

where $z \in \mathbb{R}^4$ contains the rule sentence score from the decision classifier 304 for all four possible classes (e.g., Yes, No, Irrelevant, Inquire). In an embodiment, the decision classifier 304 in the decision making module 133 may be trained under a cross entropy loss algorithm to determine a decision loss, which can be expressed as follows:

$$\mathcal{L}_{dec} = -\log \text{softmax}(z)_l \qquad \text{Equation (9)},$$

where l indicates the correct (or expected) decision.

To track whether a condition listed in the rule sentence has already been satisfied or not, the decision making module 133 performs a subtask to predict the entailment states for each rule sentence among a set of classes, such as Entailment, Contradiction and Unknown. With this intermediate supervision, the decision classifier 304 can generate a more accurate decision based on the correct entailment state of each rule sentence. For each rule sentence, the decision classifier 304 may determine an entailment state prediction score through a linear transformation operation of the updated key state values $[k_i; v_i]$ from the EMT state module 132, of which the entailment state prediction score can be expressed as follows:

$$e_i = W_e [k_i; v_i] + b_z \in \mathbb{R}^3 \qquad \text{Equation (10)},$$

where $e_i \in \mathbb{R}^3$ contains the scores of three entailment states $[\beta_{entail}, \beta_{contrad}, \beta_{unknown}]$ for the i-th rule sentence. In an embodiment, the entailment state prediction subtask implemented by the decision classifier 304 in the decision making module 133 may be trained under a cross entropy loss, normalized by the number of rule sentences M, to determine an entailment prediction loss that can be expressed as follows:

$$\mathcal{L}_{entail} = -\frac{1}{M} \sum_{i=1}^{M} \log \text{softmax}(e_i)_r, \qquad \text{Equation (11)}$$

where r indicates the correct (or expected) entailment state.

When the decision making module 133 with the decision classifier 304 predicts the decision class Inquire, a follow-up question is generated by the EMT module 130 for clarification from the user. The framework of the EMT module 130 can decompose this user-machine conversational decision making into two stages. In a first stage, the EMT module 130 with a coarse-to-fine underspecified span extraction module 134 (hereinafter referred to as the "USE module 134") can extract an underspecified span (e.g., 307) inside the rule sentence text that may refer to a portion of the regulation text 140 for which there is insufficient information to determine whether a rule is met or not. In a second stage, the EMT module 130 with the question generation module 135 can rephrase the extracted underspecified span into a follow-up question.

In various embodiments, when the decision making module 133 with the decision classifier 304 selects the decision class of "Inquire," the USE module 134 is activated. The USE module 134 can reuse the entailment state prediction scores associated with the updated entailment states of the rule sentences to identify an underspecified rule sentence 308 and extract the most informative span from the identified underspecified rule sentence 308 within in a coarse-to-fine manner. For example, the EMT module 130 with the USE module 134 can directly identify an underspecified span 307 by reusing the entailment state prediction score, $\beta_{unknown}$, of the entailment class, Unknown, from the entailment states prediction subtask to determine the likelihood of the i-th rule sentence containing the underspecified span 307, which can be expressed as follows:

$$\tilde{\beta}_i = \text{softmax}(\beta_{unknown})_i \in [0,1] \qquad \text{Equation (12)}.$$

After the USE module 134 with the coarse-to-fine reasoning process determines how likely each rule sentence is underspecified, it greatly reduces the difficulty to extract the underspecified span 307 within it.

In various embodiments, the entailment state prediction scores corresponding to the Unknown class can guide underspecified span extraction with modulation. For example, the EMT module 130 may be implemented with a soft selection approach to modulate a span extraction score from start to end of the span with a rule sentence identification score $\tilde{\beta}$.

In an embodiment, the EMT module 130 with the USE module 134 may be implemented by a BERT Question-Answer (BERTQA) model to learn a start vector $w_s \in \mathbb{R}^d$ and an end vector $w_e \in \mathbb{R}^d$ to locate the start and end positions of a rule sentence identified to contain an under-specified span (e.g., 307). The probability of j-th word in i-th rule sentence $u_{i,j}$ being the start/end of the underspecified span is computed as a dot product between $w_s$ and $u_{i,j}$, modulated by its rule sentence score $\tilde{\beta}_i$, which can be expressed as follows:

$$\gamma_{i,j} = w_s^T u_{i,j} * \tilde{\beta}_i, \delta_{i,j} = w_e^T u_{i,j} * \tilde{\beta}_i \qquad \text{Equation (13)},$$

In an embodiment, the EMT module 130 with the USE module 134 extracts the span with the highest span score γ*δ under the restriction that the start and end positions are to belong to the same rule sentence. In some examples, let s and e be the ground truth start and end positions of the span, the underspecified span extraction loss may be computed as follows:

$$\mathcal{L}_{span,s} = -\Pi_{l=inquire} \log \operatorname{softmax}(\gamma)_s \qquad \text{Equation (14)},$$

$$\mathcal{L}_{span,e} = -\Pi_{l=inquire} \log \operatorname{softmax}(\delta)_e \qquad \text{Equation (15)},$$

In some embodiments, the overall loss is the sum of the decision loss (equation (9)), entailment prediction loss (equation (11)) and the underspecified span extraction loss (equations (14), (15)), which can be computed as follows:

$$\mathcal{L}_{dec} = \mathcal{L}_{dec} + \lambda_1 \mathcal{L}_{entail} + \lambda_2 \mathcal{L}_{span} \qquad \text{Equation (16)},$$

where $\lambda_1, \lambda_2$ are hyperparameters. In some examples, $\lambda_1$ and $\lambda_2$ are set about 10.0 and 1.0, respectively, based on results on a development dataset.

Question Generator Module

In various embodiments, the question generation module 135 transforms an extracted span 309 into a well-formed follow-up question. In some examples, when the underspecified span 307 is extracted from the previous stage, the extracted span 309 is then fed into a question rephrasing model to generate a follow-up question 150. The question rephrasing model may be implemented by a pretrained language model such as the Unified Language Model (UniLM) 320 (hereinafter referred to as "the UniLM model 320"), which can be fine-tuned for the follow-up question rephrasing. The UniLM model 320 can demonstrate its effectiveness in both natural language understanding and generation tasks. Specifically, the UniLM model 320 can outperform existing approaches by a large margin on a question generation task using a benchmark dataset, such as the Stanford Question Answering Dataset (SQuAD). As depicted in FIG. 3, the UniLM model 320 receives a concatenation of rule sentence text and extracted rule sentence span as input, separated by sentinel tokens denoted as "[CLS] rule text [SEP] extracted span [SEP]." In an embodiment, the question generation module 135 with the UniLM model 320 may be trained by setting a batch size to 16, a learning rate to $2e^{-5}$ and a beam search size to 10. However, other training parameters may be set to train the UniLM model 320 without departing from the scope of the present disclosure. The training target for the UniLM model 320 is the follow-up question that is expected to be generated.

The EMT module 130 along with the underlying sub-modules can provide advantageous performance metrics over existing CMR approaches when comparing the EMT module 130 with the existing CMR approaches on the ShARC dataset, for example. For example, by having the EMT module 130 track rule sentences with external memory modules can increase both the decision accuracy and the quality of generated follow-up questions. In particular, the EMT module 130 can outperform an existing model such as $E^3$ by 1.5 in micro-averaged decision accuracy and 6.9 in cumulative 4-gram Bilingual Evaluation Understudy (BLEU4) for follow-up question generation. In addition to the performance improvement, the EMT module 130 gains interpretability over the existing approaches by tracking rules, which is visualized to show the entailment-oriented reasoning process of the EMT module 130.

Figure 4:
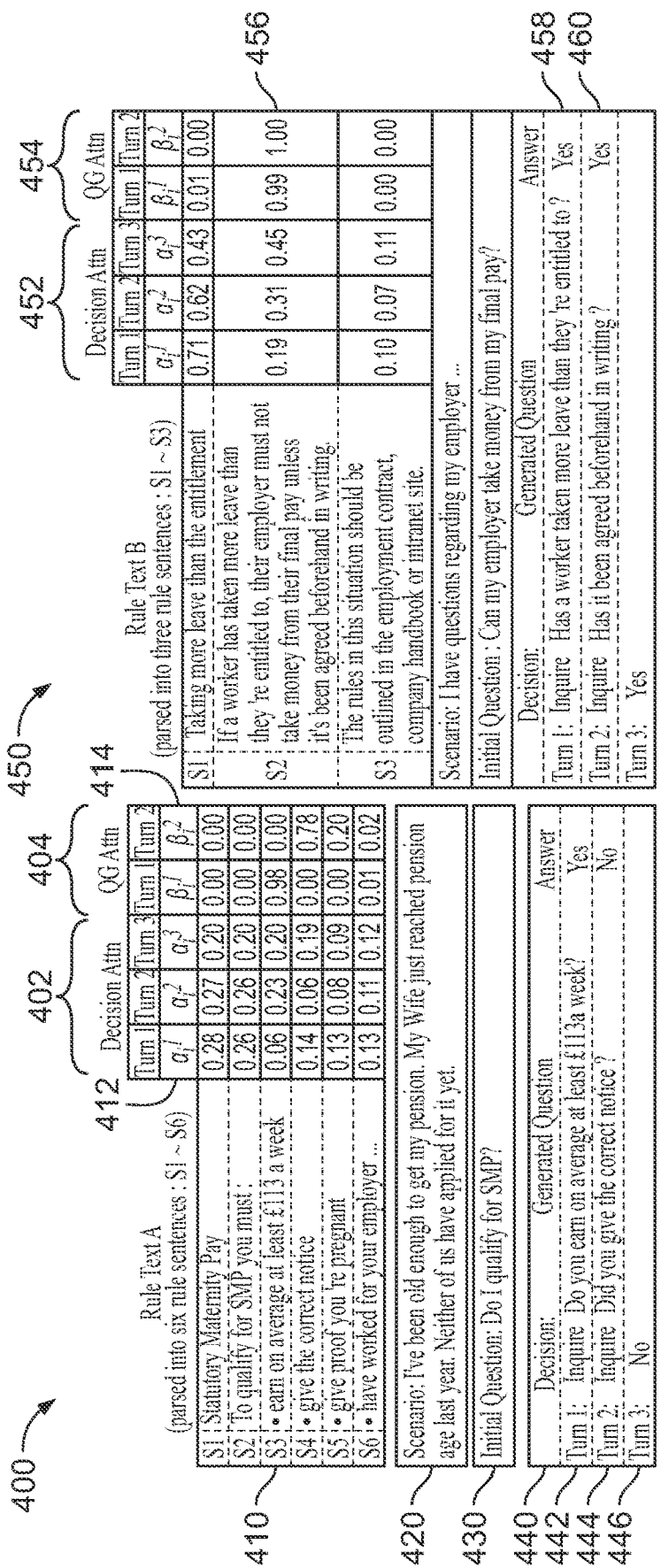
FIG. 4 is a simplified diagram of attention map transitions for different rule texts in conversational machine reading, according to some embodiments.

FIG. 4 is a simplified diagram of attention map transitions for different rule texts in conversational machine reading, according to some embodiments. The attention map transitions of FIG. 4 provide visualization of attention distributions that reveal qualitative patterns that the EMT module 130 can operate to obtain insight into the underlying entailment-oriented reasoning processes the EMT module 130 learns to perform. As depicted in FIG. 4, diagram 400 illustrates transitions of attention maps over rule sentences (depicted as "S1, S2, S3, . . . ") for decision making, such as a decision attention map 402 and question generation such as a question generation attention map 404, as the conversation flows. In some examples, extracted underspecified spans and their corresponding questions are marked with a corresponding visual indicator (e.g., color).

Given a rule text 410 (depicted as "Rule Text A") that is parsed into multiple rule sentences (e.g., S1, S2, S3, S4, S5, S6), diagram 400 shows the transition of decision making attention scores $\alpha_1, \alpha_2, \alpha_3$ in the decision attention map 402 and underspecified sentence identification attention scores $\beta_1, \beta_2$ in the question generation attention map 404, through all three turns of the user-machine conversation. At t-th turn, the decision making attention score $\alpha_i^t$ represents the decision making score of i-th rule sentence (e.g., 412) and $\beta_i^t$ represents the underspecified sentence selection score of that i-th rule sentence (e.g., 414). As depicted in FIG. 4, the decision making module 133 selects the Inquire classes for the first two dialogue turns of the user-machine conversation (depicted as "Turn 1", "Turn 2"), and generates a final decision (e.g., "No") at the last turn of the user-machine conversation (depicted as "Turn 3"). Because the last turn decision does not correspond to the decision class "Inquire," the USE module 134 is not activated during this last turn of the dialogue such that its underspecified sentence selection score (e.g., $\beta^3$) is not illustrated under the question generation attention map 404.

In some examples, diagram 400 shows an example in which the rule text 410 is expressed in the conjunction of four bullet point conditions (e.g., S3-S6). Since rule sentences with bullet points such as those depicted in diagram 400 are typically in a format of disjunction, conjunction and conjunction of disjunctions, the EMT module 130 may be trained to learn how to parse the logic structure accurately and perform logical reasoning accordingly. In a first dialogue turn 442 in a dialogue history 440, the EMT module 130 reads "User Scenario" (e.g., 420) and "Initial Question" (e.g., 430), of which the user scenario 420 and the initial question 430 inputs may imply the question from the user (e.g., 230) is relevant to the rule text (e.g., 410). Thus, a decision making attention score $\alpha_i^1$ may focus on the first two rule sentences (e.g., $\alpha_1^1 = 0.28$, $\alpha_2^1 = 0.26$), where i denotes the i-th rule sentence. On the other hand, the decision making attention score for the first bullet point corresponding to the third rule sentence (depicted as "S3") is relatively low (e.g., $\alpha_3^1 = 0.06$) compared to $\alpha_1^1$ and $\alpha_2^1$, because none of the bullet points is mentioned. Hence, the EMT module 130 with the decision making module 133 via the decision classifier 304 generates an "Inquire" decision by selecting the "Inquire" decision class. Complementary to $\alpha_3^1$, the question generation attention score for the third rule sentence denoted as $\beta_3^1$ in the question generation attention map 404 is relatively high (e.g., $\beta_3^1$=0.98) compared to $\beta_1^1$ and $\beta_2^1$, which corresponds to the clarification point for the first dialogue turn.

Once a positive answer (depicted as "Yes") is received from the user part for the first dialogue turn (e.g., 442), the EMT module 130 transits its focus from rule sentence S3 to rule sentence S4 on a second dialogue turn 444 in the dialogue history 440. However, the user response for this dialogue turn is negative (depicted as "No"), which causes the EMT module 130 to conclude a final decision (depicted as "No") in a third dialogue turn 446 in the dialogue history 440. On the third dialogue turn 446, the EMT module 130 determines and assigns relatively high decision attention scores ($\alpha_1^3 = \alpha_2^3 = \alpha_3^3 = 0.2$, $\alpha_4^3 = 0.19$) respectively to entailed rule sentences S1-S4, which means the final decision is based on these entailed rule sentences. As depicted in FIG. 4, since the bullet point rule sentence S4 is not satisfied in a conjunction of conditions, the EMT module 130 may not generate further clarification questions as evidenced by the final decision that is generated in the third dialogue turn 446.

As also depicted in FIG. 4, diagram 450 illustrates transitions of attention maps over rule sentences (depicted as "S1, S2, S3, . . . ") for decision making, such as a decision attention map 452 and question generation such as a question generation attention map 454, as the conversation flows. In contrast to diagram 400, the attention maps in diagram 450 depict the rule sentences in plain text. In some examples, the plain text typically contains complicated clauses for rule conditions. Therefore, the EMT module 130 may not place the whole sentence into a clarification question compared to the rule sentence rephrasing evidenced in diagram 400. Moreover, the second rule sentence 456 (depicted as "S2") is more complicated than that of the second rule sentence in diagram 400 in terms of it containing two rule conditions: 1) "If a worker has taken more leave than . . . ", and 2) "unless it's been agreed . . . "). In an embodiment, the EMT module 130 with both the decision making module 133 for sentence selection and the USE module 134 can contribute to generating questions correctly. For example, the EMT module 130 with the decision making module 133 can focus on the correct rule sentence (e.g., S2) for the first dialogue turn 458 and the second dialogue turn 460 ($\beta_2^1$=0.99, $\beta_2^2$=1.00, respectively), and the EMT module 130 with the USE module 134 can locate the correct underspecified spans inside the second rule sentence S2. The predicted questions are shown in diagram 450 of FIG. 4 and the ground truth questions are shown in FIG. 2.

Figure 5:
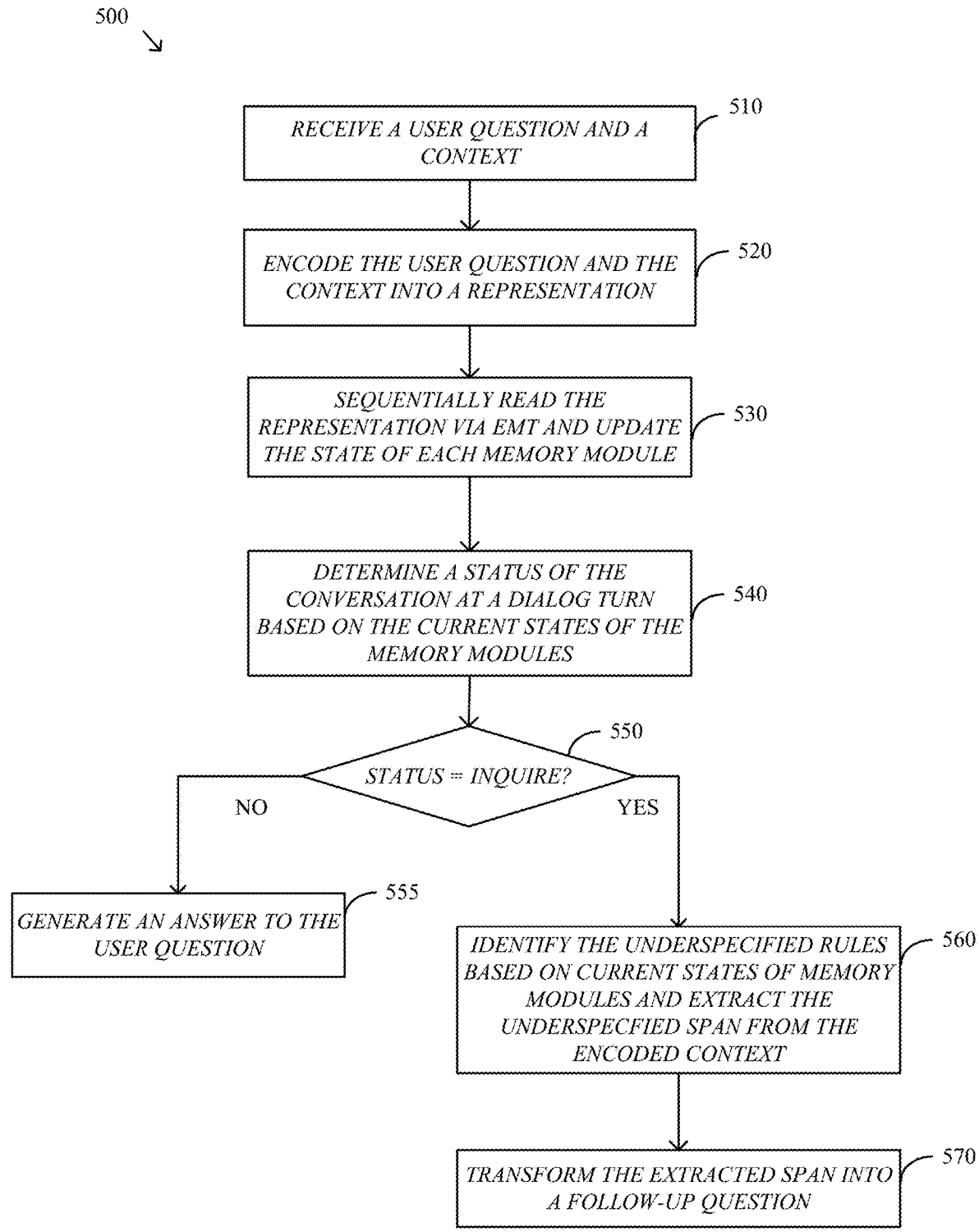
FIG. 5 is a simplified logic flow diagram of an example process for generating clarifying questions in conversational machine reading, according to some embodiments.

FIG. 5 is a simplified logic flow diagram of an example process 500 for generating clarifying questions in conversational machine reading, according to some embodiments. In some embodiments, the operations of FIG. 5 may be implemented, at least in part, in the form of executable code stored on non-transitory, tangible, machine-readable media that when run by one or more processors may cause the one or more processors to perform one or more of the operations 510-570. In some embodiments, process 500 may correspond to the method used by the EMT module 130 to generate clarifying questions in conversational machine reading. In various embodiments, the operations of FIG. 5 may be implemented as software instructions executed by one or more logic devices associated with corresponding electronic devices and/or structures depicted in FIGS. 1 and 3. More generally, the operations of FIG. 5 may be implemented with any combination of software instructions, neural networks, and/or electronic hardware (e.g., digital components).

It should also be appreciated that any step, sub-step, sub-process, or block of process 500 may be performed in an order or arrangement different from the embodiments illustrated by FIG. 5. For example, in other embodiments, one or more blocks may be omitted from or added to each individual process. Furthermore, block inputs, block outputs, state information, and/or other operational parameters may be stored to one or more memories prior to moving to a following portion of a corresponding process. Although process 500 is described with reference to systems described in FIGS. 1-4, process 500 may be performed by other systems different from those systems and including a different selection of electronic devices, neural networks, and/or pre-trained model parameters.

The process 500 starts at step 510, where an input of an initial user question and a context is received. For example, the context includes any one of a regulation text, a dialogue history, and a user scenario. In some examples, the EMT module 130 receives at least the regulation text 140 and can optionally receive the dialogue history 141, the initial user question 142 and/or the user scenario 143, as user input. In some aspects, the EMT module 130 can tokenize the inputs into an input sequence with preceding classification tokens (e.g., CLS) for each tokenized vector of inputs.

Next, at step 520, the user question and the context is encoded into a contextualized representation. For example, a BERT language model may be used to encode the input information into a contextualized representation vector. For example, the EMT module 130 with a BERT transformer encoder can encode the input sequence into a concatenation of rule sentence keys and corresponding rule sentence state values based at least on the input context (e.g., dialogue history 141, initial user question 142, user scenario 143).

Subsequently, at step 530, the representation stored may be sequentially read in a plurality of memory modules of the memory 120 to update the state of each memory module. For example, the EMT module 130 may be adapted to track the state of each rule sentence (in the encoded contextualized representation vector) by determining the entailment states of each of the rule sentences according to each input context such as the initial user question 142, the user scenario 143 and P turns of the dialogue history 141.

Next, at step 540, an status of the conversation at a dialogue turn is determined based on current entailment states of the plurality of memory modules. For example, the EMT module 130 with the EMT state module 132 and the decision classifier 304 may be adapted to perform entailment-oriented reasoning according to the most updated entailment states of the rule sentences and generate a rule sentence prediction score to select a decision class among "Yes/No/Irrelevant/Inquire," thereby indicating at the particular dialogue turn, whether any further clarification is needed to generate a final answer that is responsive to the initial user question.

Subsequently, at step 550, when the determined status corresponds to "Inquire," indicating further clarification is needed to generate a final answer responsive to the initial user question, process 500 proceeds to step 560. Still at step 550, when determined status does not correspond to "Inquire" but rather any of "Yes/No/Irrelevant," indicating no further clarification is needed to generate a final answer to the user question, then the process 500 proceeds to step 555. At step 555, the EMT module 130 generates a final answer to the initial user question.

At step 560, the underspecified rule sentence span is identified based on the current entailment states in the memory modules, by which an informative span is extracted from the underspecified rule sentence. Subsequently, at step 570, the extracted informative span is then transformed by rephrasing the extracted span into a follow-up question associated with the initial user question.

Figure 6:
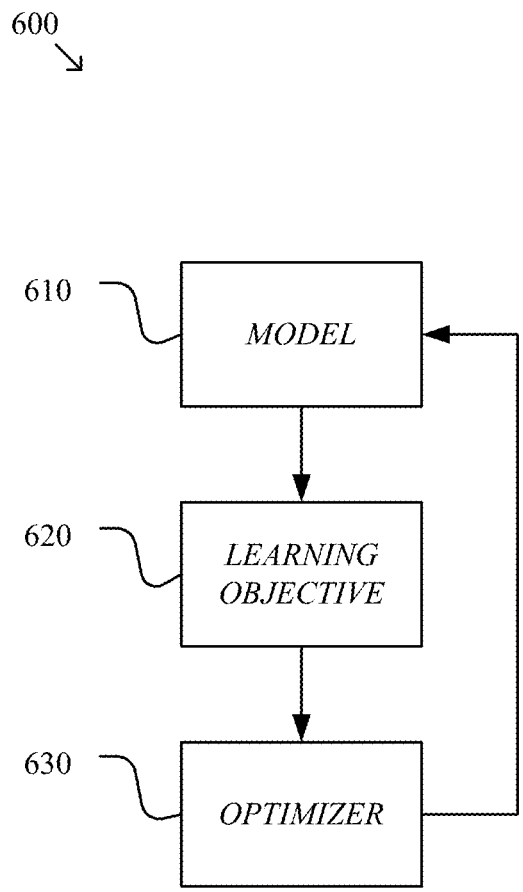
FIG. 6 is a simplified diagram of a training configuration for a neural network model, according to some embodiments.

FIG. 6 is a simplified diagram of a training configuration 600 for a neural network model according to some embodiments. As depicted in FIG. 6, training configuration 600 is used to train a model 610. In some embodiments consistent with FIGS. 1-4, model 610 may be used to implement one or more of the EMT module 130, the decision classifier 304, or the UniLM model 320.

In some embodiments, training configuration 600 may be used to train a plurality of model parameters of model 610. During training, a large number of training examples (e.g., user question sequences, context sequences, and/or rule text sequences) are provided to model 610. The predicted member scores (e.g., rule sentence score, entailment state prediction score, decision making attention score, question generation attention score) generated by model 610 are compared to a ground truth value for each of the examples using a learning objective 620, which may determine a cross entropy loss associated with a given predicted member score based on the ground truth value. In various embodiments, the learning objective 620 corresponds to a training target for the model 610, in which the learning objective 620 may target the model 610 to learn how to generate the follow-up question that is expected to be generated.

The output of learning objective 620 (e.g., the cross entropy loss) is provided to an optimizer 630 to update the model parameters of model 610. For example, optimizer 630 may determine the gradient of the objective with respect to the model parameters and adjust the model parameters using back propagation. In some embodiments, optimizer 630 may include a gradient descent optimizer (e.g., stochastic gradient descent (SGD) optimizer), an ADAM optimizer, an Adagrad optimizer, an RMSprop optimizer, and/or the like. Various parameters may be supplied to optimizer 630 (e.g., a learning rate, a decay parameter, and/or the like) depending on the type of optimizer used. For example, the EMT module 130 is trained by providing the learning objective 620 to the ADAM optimizer with a learning rate of about $5e^{-5}$, a warm-up rate of about 0.1 and a dropout rate of about 0.35. In another example, the follow-up question generation model, such as the UniLM model 320, can be trained by setting the batch size to about 16, the learning rate to about $2e^{-5}$ and the beam search size to about 10.

Figure 7:
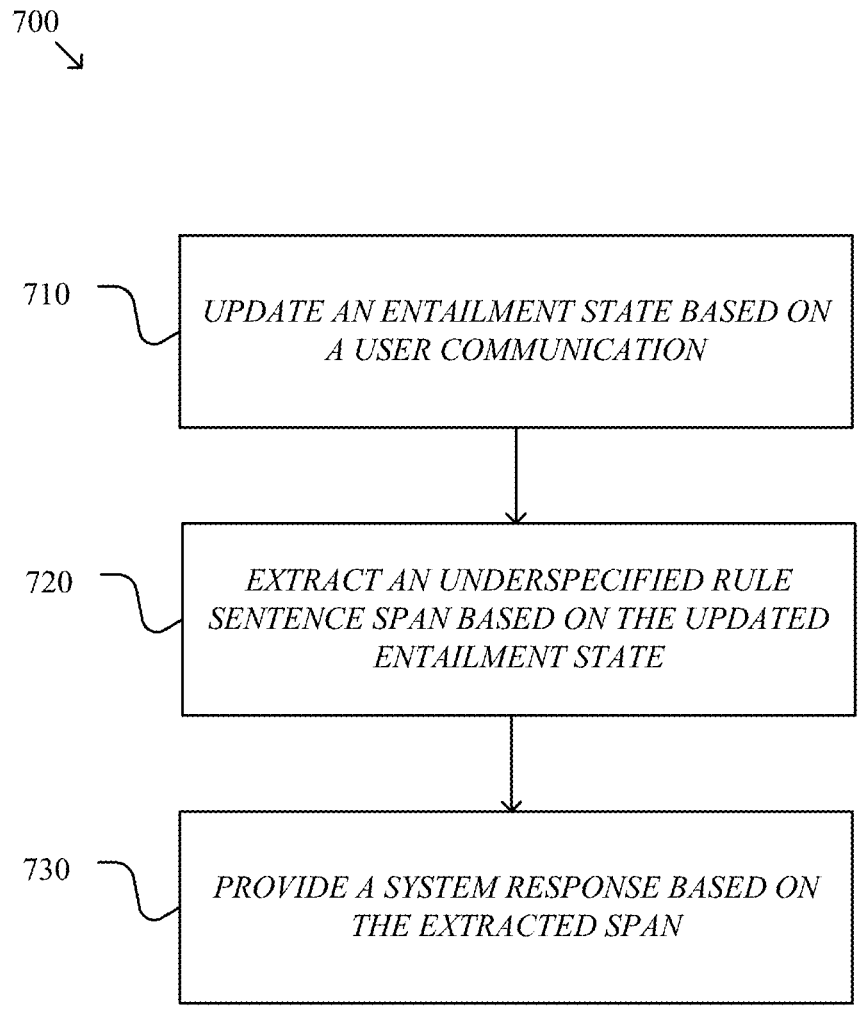
FIG. 7 is a simplified diagram of a process for tracking an entailment state associated with a dialogue between a user and a digital system, according to some embodiments.

FIG. 7 is a simplified diagram of a process 700 for tracking an entailment state associated with a dialogue between a user and a digital system, such as computing device 100, according to some embodiments. In various embodiments consistent with FIGS. 1-5, all or portions of process 700 may be performed using a processor, such as processor 110. In some embodiments, all or portions of process 700 may be performed by evaluating a neural network model, such as EMT module 130, decision classifier 304 and/or UniLM model 320.

At step 710, an entailment state is determined and updated in a memory module of the memory 120 based on a user communication (or a digital representation thereof, the representation having been received, e.g., from a user device). In various embodiments, the user communication includes contextual information of a user-machine conversation, including among others, regulation text, dialogue history, initial user question, and/or user scenario. In some embodiments, the entailment state may be updated using an explicit memory tracker associated with the digital system, such as the EMT state module 132. Consistent with such embodiments, the EMT module 130 may receive an input sequence containing a concatenation of the user communication portions. In an embodiment, the input sequence is formatted in terms of tokenized vectors of the user communication portions, including classification tokens associated with respective user input portions. The EMT module 130 may encode the input sequence of tokenized vectors of the user communication into an encoded contextualized representation vector, in which each rule sentence in the regulation text is allocated to a respective memory module along with an entailment state to track whether at least a portion of a rule sentence has been satisfied in the user-machine conversation. In various embodiments, the memory modules are updated to reflect a status of respective rule sentences in response to corresponding user communication portions. In some embodiments, the EMT module 130 may determine a rule sentence score for a decision making task to determine a decision class based on the overall entailment status of each rule sentence. Based on the rule sentence scores from the corresponding entailment states, the highest rule sentence score may indicate that a particular rule sentence is underspecified.

At step 720, an underspecified rule sentence span is extracted based on the updated entailment state. In some embodiments, the rule sentence scores may be used for extracting an informative span from an underspecified rule sentence by utilizing a coarse-to-fine reasoning process. In this respect, token-level span distributions may be weighted with sentence-level selection scores of the rule span. For example, based on the sentence-level selection scores, the token-level span distributions may be modulated by its corresponding sentence-level selection score. The modulated token-level distributions may be used to identify the start and end positions of the underspecified rule span for extraction. In various embodiments, the extracted span is fed into a pre-trained language model to formulate a follow-up question by question rephrasing of the extracted span.

At step 730, a system response with the follow-up question is provided based on question rephrasing of the extracted span. In some embodiments, the system response may be provided using a response module, such as response module 170. In some embodiments, the system response may include providing a response dialogue to the user, requesting additional information from the user, and/or the like. In some embodiments, the response module may record one or more actions taken at step 730, e.g., by updating the contextual information. Accordingly, when process 700 is repeated during subsequent exchanges of a dialogue with the user, the explicit memory tracker (e.g., EMT module 130) may access the updated contextual information when updating the entailment state.

Figure 8:
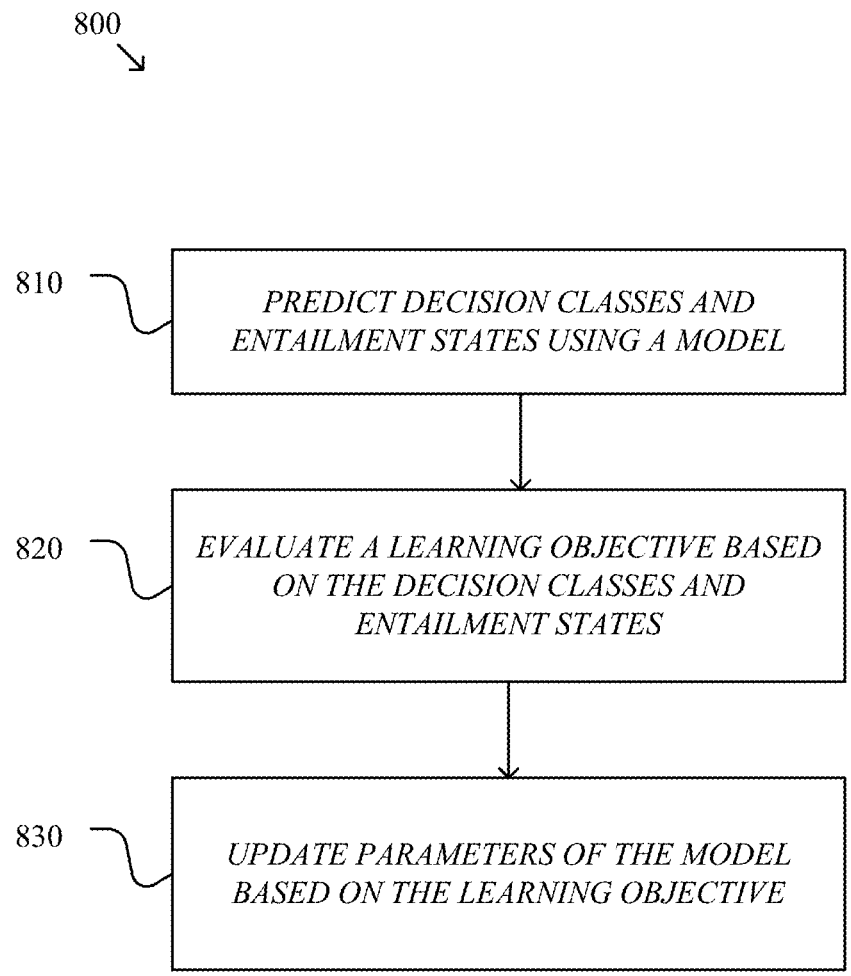
FIG. 8 is a simplified diagram of an example process for training a neural network model, according to some embodiments.

FIG. 8 is a simplified diagram of a process 800 for training a neural network model according to some embodiments. In various embodiments consistent with FIGS. 1 and 3-7, process 800 may be used to train a neural network model, such as EMT module 130, decision classifier 304 and/or UniLM model 320. During training, the neural network model may be configured in a training configuration, such as training configuration 600. In some examples, process 800 may be performed iteratively over a large number of training examples to gradually train the neural network model.

In an embodiment, the training dataset includes data augmentation. In an annotated process of the ShARC dataset, the user scenario is annotated from at least a portion of the dialogue history, of which that portion of dialogue history is excluded from input to the neural network model. Instead, that portion of dialogue history is treated as the evidence that is entailed from the user scenario. To effectively utilize this additional input signal, additional training examples are generated by replacing the scenario as evidence, which leads to an additional 5800 training instances. The augmented training dataset is fed to the EMT module 130 for training.

At a process 810, decision classes and/or entailment states are predicted using the neural network model. In some embodiments, the decision classes and/or entailment states may be generated based on a training example that includes a training communication. In some embodiments, the decision classes and/or entailment states may be generated according to process 700.

At a process 820, a learning objective is evaluated based on the decision classes and/or entailment states. In some embodiments, the learning objective may correspond to learning objective 620. In some embodiments, the learning objective may be evaluated by comparing the decision classes and/or entailment states predicted at process 810 to a ground truth answer corresponding to the training communication.

In various embodiments, to supervise the subtask of entailment prediction for each rule sentence, the EMT module 130 with the decision making module 133 can be trained to assign all questions in the dialogue history with one rule sentence that contains the underspecified span, and label their corresponding decision classes "Yes" and "No" as states "Entailment" and "Contradiction," respectively. When the rule sentence is not matched by any question, its entailment state is labeled as "Unknown."

In some embodiments, to supervise the process of coarse-to-fine reasoning, the EMT module 130 with the USE module 134 can be trained to automatically label target rule spans, such as underspecified spans. In an embodiment, the USE module 134 may be trained to first trim follow-up questions by removing question words, such as "do," "does," "did," "is," "was," "are," "have" and the question mark "?". For each trimmed question, the USE module 134 may be trained to determine the shortest span inside the rule text that has a minimum edit distance from the trimmed question and treat the shortest span as an underspecified span.

At a process 830, the parameters of the neural network model are updated based on the learning objective. In some embodiments, the model parameters may be updated using an optimizer, such as optimizer 630. In some embodiments, the parameters may be updated by determining a gradient of the learning objective with respect to the model parameters and updating the parameters based on the gradient. The gradient of the learning objective may be determined by back propagation.

FIG. 9 illustrates a tabular listing 900 of end-to-end task performance metrics, according to some embodiments. The tabular listing 900 includes end-to-end task performance based on a blind, held-out test set from the ShARC dataset. The tabular listing 900 depicts values for different models, including an EMT model 910, for micro-accuracy and macro-accuracy performance of the decision making task. The results tabulated in the tabular listing 900 show that the EMT model 910 has strong capability in both decision making and follow-up question generation tasks. If both the ground truth decision and the predicted decision are "Inquire," then a generated follow-up question may be evaluated using a BLEU score (e.g., BLEU1, BLEU4). The tabular listing 900 includes performance metrics for the EMT model 910, which illustrates outperformance over multiple existing models, such as $E^3$, on decision classification in both micro- and macro-accuracy. For example, the EMT model 910 depicts micro- and macro-accuracy values of 69.4 and 74.8, respectively, which are highest compared to the existing models. Although BLEU scores may not be directly comparable among the different existing models, the EMT model 910 can achieve competitive BLEU1 and BLEU4 scores compared to existing models for a predicted decision class "Inquire." For example, the EMT model 910 has BLUE1 and BLUE4 score values of 60.9 and 46.0, respectively.

FIG. 10 illustrates a tabular listing 1000 of class-wise prediction accuracy values, according to some embodiments. In an embodiment, the tabular listing 1000 includes class-wise decision prediction accuracy on four decision classes. As depicted in tabular listing 1000, an EMT model 1010 provides a highest decision prediction accuracy for the "Inquire" decision class, compared to other existing models in the tabular listing 1000. For example, the EMT model 1010 can yield a prediction accuracy of 68.7 for the "Inquire" decision class. In some aspects, the EMT model 1010 can provide the highest prediction accuracy for multiple decision classes based at least on the EMT model 1010 being adapted to track states of all rule sentences and perform entailment-oriented decision making.

FIG. 11 illustrates a tabular listing 1100 of question generation tasks performance metrics, according to some embodiments. The tabular listing 1100 includes question generation task results based on a development set and cross validation set. As depicted in the tabular listing 1100, an EMT model 1110 is compared to a first model (depicted as "$E^3$ model") and a second model that is an extension version of E3 with a uniform language model (depicted as "$E^3$+UniLM"). In an embodiment, the uniform language model corresponds to the UniLM model 320. In some aspects, the E3+UniLM model can perform better than the $E^3$ model, which can validate the effectiveness of the UniLM model 320. In various embodiments, the EMT model 1110 consistently outperforms the $E^3$ model and the $E^3$+UniLM model on both the development set and the cross validation set by a relatively large margin. Although there may be no ground truth label for span extraction, an inference can be made from the question generation results that the coarse-to-fine reasoning process can extract rule text spans more effectively than extraction and retrieval modules of the $E^3$ model. This outperformance by the EMT model 1110 may be because the $E^3$ model propagates errors from the span extraction module to the span retrieval module, whereas the coarse-to-fine reasoning process can minimize (or at least reduce) error propagations through weighting token-level span distributions with corresponding sentence-level selection scores.

FIG. 12 illustrates a tabular listing 1200 of ablation study results on end-to-end tasks and question generation tasks, according to some embodiments. The tabular listing 1200 describes four ablations of an EMT model implemented by the EMT module 130. The four EMT model ablations include: (1) the EMT model excluding data augmentation (depicted as "EMT (w/o data aug)"); (2) the EMT model excluding coarse-to-fine reasoning (depicted as "EMT (w/o c2f)"); (3) the EMT model excluding entailment state prediction (depicted as "EMT (w/o $\mathcal{L}_{entail}$)"); and (4) the EMT model excluding explicit memory tracking (depicted as "EMT (w/o tracker)").

The EMT model may be implemented without data augmentation to train the EMT model on an original ShARC training set. The EMT model implemented with data augmentation (hereinafter referred to as "the original EMT model") shows the performance is slightly improved over the EMT model without data augmentation for the end-to-end task. This may imply that the size of the ShARC dataset without data augmentation is a bottleneck for end-to-end neural network models.

The EMT model may be implemented without the coarse-to-fine reasoning to extract the underspecified rule span without the rule sentence prediction score $\tilde{\beta}$. Without the coarse-to-fine reasoning approach for span extraction, the performance of the EMT (w/o c2f) may be reduced by about 1.28 compared to the EMT model with data augmentation and coarse-to-fine reasoning, according to the BLEU4 scoring technique. This BLEU4 score may imply that coarse-to-fine reasoning is advantageous for the question generation task. This may be because, as a classification task, the entailment state prediction subtask can be trained efficiently with a limited amount of data (e.g., about 6800 training examples). Therefore, the Unknown scores in the entailment state prediction can guide underspecified span extraction via a soft modulation. On the other hand, purely underspecified span extraction may not utilize the entailment states of the rule sentences from the EMT model, meaning the EMT model may not learn to extract the underspecified span of the rule text.

The EMT model may be implemented without the entailment state prediction subtask in the decision making, and thus the rule sentence score $\tilde{\beta}$ may be used for span extraction. With the guidance of explicit entailment supervision, the original EMT model can outperform the EMT (w/o $\mathcal{L}_{entail}$) model by a relatively large margin. Based on the entailment states of all rule sentences, the original EMT model may learn to perform logic reasoning on conjunction of conditions or disjunctions of conditions as a task in decision making. The entailment supervision can also help the original EMT model with the span extraction through the coarse-to-fine reasoning process.

The EMT model may be implemented without explicit memory tracking and may treat the classification token for each rule sentence as the state for decision making and span extraction. As illustrated in the tabular listing 1200, the EMT (w/o tracker) model may perform with significantly lesser performance on the decision making task compared to the original EMT model. Although interactions between rule sentences and user information may exist in the BERT transformer encoder through multi-head self-attention, the interactions may not be adequate for the EMT model to learn whether conditions listed in the rule text have already been satisfied.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system for conducting user-machine interactions in a machine learning network, comprising:
   a communication interface that receives user provided information including a user question in a user-machine interaction;
   a memory storing a plurality of processor-executed instructions; and
   a processor reading and executing the processor-executed instructions from the memory to:
   train a gated recurrent memory-augmented neural network to sequentially read a sentence-level representation of a rule sentence and corresponding state information from a plurality of memory modules in a memory;
   encode, by an encoder neural module, an input sequence comprising regulation text and the user provided information into a contextualized representation vector;
   track, by an explicit memory tracker module having the trained gated recurrent memory-augmented neural network, an entailment state for each of one or more rule sentences in the regulation text by sequentially reading a sentence-level representation of the user provided information and updating the entailment state for each of the one or more rule sentences based on a gated operation at each time step corresponding to the sequential reading, wherein the entailment state indicates whether at least a condition corresponding to each of the one or more rule sentences has been satisfied in the user-machine interaction;
   generate, by a decision making module, a decision prediction with an entailment-oriented reasoning operation based on the entailment state;
   extract, by a question generator module, an underspecified span from the one or more rule sentences based at least on the decision prediction for a corresponding entailment state;
   generate a clarifying question based on a rephrasing operation on the underspecified span; and
   wherein the communication interface is configured to provide the clarifying question as a response to the user question in the user-machine interaction.

2. The system of claim 1, wherein the input sequence comprises a concatenation of the regulation text and the user provided information that comprises a user scenario, a dialogue history and an initial user question.

3. The system of claim 1, wherein the contextualized representation vector comprises a sequence of vectors with a same length as that of the input sequence.

4. The system of claim 1, wherein the contextualized representation vector is allocated to a plurality of memory modules in a memory, and wherein a plurality of vectorized representations of the user provided information in the contextualized representation vector are allocated to respective ones of the plurality of memory modules.

5. The system of claim 4, wherein the contextualized representation vector comprises a token-level representation and a sentence-level representation for each of one or more rule sentences in the regulation text.

6. The system of claim 5, wherein the explicit memory tracker module is further configured to:
allocate the one or more rule sentences in terms of sentence-level representations to the plurality of memory modules as a plurality of keys; and
assign a state to each of the plurality of keys to store updated entailment information that indicates whether a rule sentence has been entailed from the user provided information in the plurality of memory modules.

7. The system of claim 6, wherein each of the plurality of keys includes an explicit meaning that corresponds to one of the one or more rule sentences, wherein the plurality of keys vary based at least on different rule texts of corresponding rule sentences.

8. The system of claim 6, wherein the plurality of keys comprises a number of keys that is dynamically generated based at least on a number of rule sentences parsed from the regulation text.

9. The system of claim 5, wherein the decision making module comprises a decision classifier configured to generate the decision prediction that indicates a selection of one of a plurality of decision classes based at least on updated entailment states for each of the one or more rule sentences.

10. The system of claim 9, wherein the decision prediction is generated based at least on a plurality of rule sentence scores that correspond to the plurality of decision classes, wherein the decision classifier is further configured to determine the plurality of rule sentence scores through a linear transformation operation of a summary vector for an overall entailment state, and wherein the summary vector comprises an attention weight for each of the one or more rule sentences that indicates a likelihood that the rule sentence is entailed from the user provided information.

11. The system of claim 9, wherein the decision making module is further configured to generate an entailment state prediction score for each of the one or more rule sentences to determine whether a condition listed in the rule sentence has already been satisfied, and wherein the entailment state predication score includes a plurality of scores corresponding to respective ones of a plurality of entailment states.

12. The system of claim 11, wherein the entailment state prediction score is generated through a linear transformation operation of the updated entailment states for each of the one or more rule sentences.

13. The system of claim 11, wherein the underspecified span is extracted when the decision making module selects a specified decision class from the plurality of decision classes.

14. The system of claim 13, further comprising a coarse-to-fine underspecified span extraction module configured to extract the underspecified span using the entailment state prediction score that corresponds to the specified decision class to determine a likelihood of the rule sentence containing the underspecified span, wherein the underspecified span is identified by modulating a span extraction score from start to end of the underspecified span with a rule sentence identification score.

15. The system of claim 1, wherein the explicit memory tracker module is further configured to:
determine an update to the entailment state of each of the one or more rule sentences; and
perform a write operation to a respective one of the plurality of memory modules associated with the one or more rule sentences with the update to the entailment state.

16. The system of claim 1, wherein the explicit memory tracker module is further configured to update a state value associated with the sentence-level representation of each of the one or more rule sentences by operatively comparing the user provided information to state information stored in a corresponding memory module of the plurality of memory modules.

17. A non-transitory, machine-readable storage medium having stored thereon machine-readable instructions executable to cause a system to perform operations for conducting user-machine interactions with a machine learning network, comprising:
training a gated recurrent memory-augmented neural network to sequentially read a sentence-level representation of a rule sentence and corresponding state information from a plurality of memory modules in a memory;
receiving, via a communication interface, an input of regulation text and user provided information including a user question in a user-machine interaction;
encoding, by an encoder neural model implemented on one or more processors, the regulation text and the user provided information into a contextualized representation;
updating, by an explicit memory tracker module having the trained gated recurrent memory-augmented neural network, state information associated with one or more rule sentences in the regulation text by sequentially reading a sentence-level representation of the user provided information encoded in the contextualized representation and updating the state information for each of the one or more rule sentences based on a gated operation at each time step corresponding to the sequential reading, wherein the state information indicates whether at least a condition corresponding to each of the one or more rule sentences has been satisfied in the user-machine interaction;
determining a status of the user-machine interaction at a dialogue turn based on the updated state information;
extracting an informative span from the contextualized representation based on the status of the user-machine interaction;
transforming the extracted informative span into a follow-up question corresponding to the user question in the user provided information; and
providing, via the communication interface, the follow-up question as a response to the user question in the user-machine interaction.

18. A method of conducting user-machine interactions in a machine learning network, the method comprising:
training a gated recurrent memory-augmented neural network to sequentially read a sentence-level representation of a rule sentence and corresponding state information from a plurality of memory modules in a memory;

receiving, via a communication interface, user provided information including a user question in a user-machine interaction;

encoding, by an encoder neural model implemented on one or more processors, regulation text and the user provided information into a contextualized representation;

updating, by an explicit memory tracker module having the trained gated recurrent memory-augmented neural network, state information associated with one or more rule sentences of the regulation text stored in a plurality of memory modules by sequentially reading a sentence-level representation of the user provided information encoded in the contextualized representation and updating the state information for each of the one or more rule sentences based on a gated operation at each time step corresponding to the sequential reading, wherein the state information indicates whether at least a condition corresponding to each of the one or more rule sentences has been satisfied in the user-machine interaction;

determining a status of the user-machine interaction at a dialogue turn from the plurality of memory modules based at least on the updated state information;

extracting an informative span from the contextualized representation with a coarse-to-fine reasoning operation based on the status of the user-machine interaction;

rephrasing the extracted informative span into a follow-up question corresponding to the user question in the user provided information; and providing, via the communication interface, the follow-up question as a response to the user question in the user-machine interaction.

19. The method of claim 18, wherein, when the status of the user-machine interaction indicates that at least a portion of the user provided information requires further clarification, the method further comprising:

identifying an underspecified rule sentence from the one or more rule sentences based on entailment score information of the updated state information using a coarse-to-fine reasoning operation; and extracting the informative span from the underspecified rule sentence by modulation of a span extraction score of the informative span with at least a portion of the entailment score information.

20. The method of claim 18, further comprising, by the explicit memory tracker module,:

determining an update to an entailment state of each of the one or more rule sentences; and perform a write operation to a respective one of the plurality of memory modules associated with the one or more rule sentences with the update to the entailment state.

* * * * *